US006885972B2

(12) United States Patent
Samata et al.

(10) Patent No.: US 6,885,972 B2
(45) Date of Patent: Apr. 26, 2005

(54) METHOD FOR PREDICTING LIFE SPAN OF ROTARY MACHINE USED IN MANUFACTURING APPARATUS AND LIFE PREDICTING SYSTEM

(75) Inventors: Shuichi Samata, Yokohama (JP); Yukihiro Ushiku, Yokohama (JP); Takeo Furuhata, Yokohama (JP); Takashi Nakao, Kawasaki (JP); Ken Ishii, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/229,005

(22) Filed: Aug. 28, 2002

(65) Prior Publication Data

US 2003/0153997 A1 Aug. 14, 2003

(30) Foreign Application Priority Data

Aug. 31, 2001 (JP) ............................ P2001-264277

(51) Int. Cl.[7] .............................................. G06F 19/00
(52) U.S. Cl. .................... 702/182; 702/185; 702/183
(58) Field of Search .............................. 702/34, 35, 36, 702/182, 183, 184, 185; 700/29, 30, 32, 108, 121, 123, 174, 175, 177, 266, 287

(56) References Cited

U.S. PATENT DOCUMENTS

| | | | | |
|---|---|---|---|---|
| 5,146,417 A | * | 9/1992 | Watson ......................... | 702/85 |
| 5,210,704 A | * | 5/1993 | Husseiny ....................... | 702/34 |
| 5,406,502 A | * | 4/1995 | Haramaty et al. ........... | 702/183 |
| 5,501,105 A | * | 3/1996 | Hernandez et al. ............ | 73/660 |
| 5,586,066 A | * | 12/1996 | White et al. ................. | 702/181 |
| 5,870,699 A | * | 2/1999 | Canada et al. ............... | 702/190 |
| 6,199,018 B1 | * | 3/2001 | Quist et al. .................... | 702/34 |
| 6,208,953 B1 | * | 3/2001 | Milek et al. .................... | 703/7 |
| 6,226,597 B1 | * | 5/2001 | Eastman et al. .............. | 702/34 |
| 6,260,004 B1 | * | 7/2001 | Hays et al. .................. | 702/183 |
| 6,297,742 B1 | * | 10/2001 | Canada et al. .............. | 340/635 |
| 6,392,584 B1 | * | 5/2002 | Eklund ......................... | 341/183 |
| 6,434,512 B1 | * | 8/2002 | Discenzo .................... | 702/184 |
| 6,438,440 B1 | * | 8/2002 | Hayashi ....................... | 700/121 |
| 6,526,831 B1 | * | 3/2003 | Ben-Romdhane ............ | 73/660 |
| 6,665,576 B1 | * | 12/2003 | Hayashi ....................... | 700/121 |
| 2002/0083773 A1 | * | 7/2002 | Ben-Romdhane ............ | 73/660 |
| 2003/0009311 A1 | * | 1/2003 | Ushiku et al. ............... | 702/184 |
| 2003/0149547 A1 | * | 8/2003 | Nakao et al. ................ | 702/183 |

FOREIGN PATENT DOCUMENTS

| | | |
|---|---|---|
| JP | 5-195980 | 8/1993 |
| JP | 8-261886 | 10/1996 |
| JP | 11-62846 | 3/1999 |
| JP | 2000-259222 | 9/2000 |
| JP | 2000-269515 | 9/2000 |

OTHER PUBLICATIONS

Yamasawa et al., "Diagnostic Sytem to Determine the In–Service Life of Dry Vacuumn Pumps", IEEE, 1999.*

* cited by examiner

*Primary Examiner*—Patrick Assouad
(74) *Attorney, Agent, or Firm*—Finnegan, Henderson, Farabow, Garrett & Dunner, L.L.P.

(57) ABSTRACT

A method for predicting life span of a rotary machine used in a manufacturing apparatus, includes: measuring rotary machine acceleration evaluation time series data with a sampling interval being less than a half the cycle of an analysis target frequency, a number of samplings being at least four times the analysis target frequency; generating evaluation diagnosis data based on variations in characteristics corresponding to the analysis target frequency by subjecting the evaluation time series data to frequency analysis; and determining the life span of the rotary machine using the evaluation diagnosis data.

8 Claims, 14 Drawing Sheets

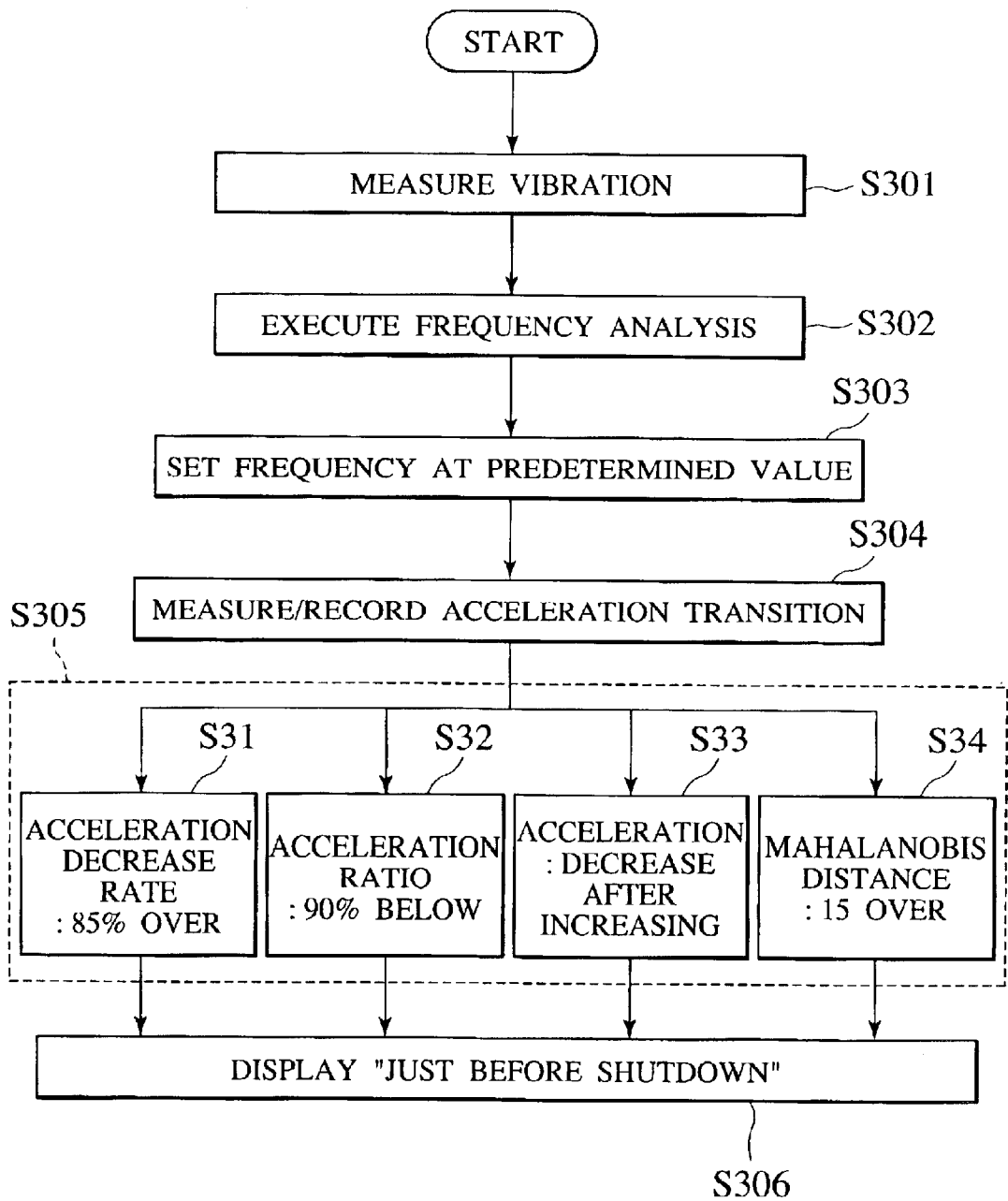

US 6,885,972 B2

METHOD FOR PREDICTING LIFE SPAN OF ROTARY MACHINE USED IN MANUFACTURING APPARATUS AND LIFE PREDICTING SYSTEM

CROSS REFERENCE TO RELATED APPLICATIONS

This application is based upon and claims the benefit of priority from prior Japanese Patent Application 2001-264277 filed on Aug. 31, 2001; the entire contents of which are incorporated herein by reference.

BACKGROUND OF THE INVENTION

1. Field of the Invention

The present invention relates to prediction and diagnostic techniques for life span of a rotary machine used in a manufacturing apparatus. In particular, it relates to a diagnosis method for predicting the life span of a rotary machine such as a dry pump and a manufacturing apparatus including the rotary machine.

2. Description of the Related Art

In recent years, semiconductor manufacturing apparatus failure diagnostic techniques have become important to ensure efficient semiconductor device manufacturing. Especially as the trend towards many item/small volume production of system LSI grows, an efficient yet highly adaptable semiconductor device manufacturing method has become necessary.

There are methods of using a plurality of small-scale production lines to accomplish efficient semiconductor device production. However, if a large-scale production line is merely shortened, the capacity utilization of the manufacturing apparatus drops. Moreover, this causes the problem where investment efficiency falls. To rectify this situation, there is a method by which a plurality of manufacturing processes is performed with one piece of semiconductor manufacturing apparatus. In the case of low pressure chemical vapor deposition (LPCVD) apparatus using a dry pump for the evacuation system, reactive gases and reaction products differ and formation situations for the reaction products within the dry pump differ depending on the type of manufacturing processes. Therefore, the manufacturing process affects the life span of the dry pump. If the dry pump should have a shutdown during a specific manufacturing process, then the lot being processed becomes defective. Moreover, the excessive maintenance of the manufacturing apparatus may become necessary due to microscopic dust caused by residual reactive gases within the manufacturing apparatus. Implementation of such excessive maintenance causes the manufacturing efficiency of the semiconductor device to drop dramatically. If regular maintenance is scheduled with a margin of safety in order to prevent such sudden shutdowns during the manufacturing process, the frequency of maintenance work on the dry pump may become astronomical. Not only does this increase maintenance costs, but also the decrease in capacity utilization of the semiconductor manufacturing apparatus becomes remarkable due to changing the dry pump, causing the manufacturing efficiency of the semiconductor device to sharply decrease.

Previously, some methods of diagnosing dry pump life span have been proposed. Basically, a state of the dry pump may be monitored by characteristics such as the motor current, vibration, and temperature, and methods have been provided to predict life span from changes in these characteristics. In particular, dry pump life span diagnosis methods have mainly been provided monitoring the state of the dry pump through vibrations caused by the rotation of a rotor. Since a diagnosis using the vibration can be accomplished through measurements taken by merely attaching an accelerometer to a side of the dry pump, and it has gained attention as a simple and easy method for predicting life span. In addition, as a method for predicting life span through measured vibration data, there has been proposed a method where deviation from a reference value for a high frequency component near 300 Hz is analyzed using neural networks (refer to Japanese Patent Application P2000-64964).

In the case of the technology disclosed in Japanese Patent Application P2000-64964, since a targeted frequency is high, changes accompanying pump operation, such as reaction product blockage may broaden leading to a problem of decreased sensitivity.

Meanwhile, in order to use of semiconductor manufacturing apparatus in common for a plurality of processes, as is necessary for an efficient small-scale production line, it is desirable to accurately diagnose a vacuum pump life span and to operate the dry pump without having any waste in terms of time. Therefore, highly accurate life span prediction is essential. However, when an accelerometer is attached to the dry pump, sensitivity changes depending on where and how it is attached, and a collection of highly sensitive and stable vibration data is difficult.

SUMMARY OF THE INVENTION

A first aspect of the present invention inheres in a method for predicting life span of a rotary machine used in a manufacturing apparatus, includes: measuring rotary machine acceleration evaluation time series data with a sampling interval being less than a half of the reciprocal of an analysis target frequency, wherein the sampling interval is the time between samples within a single sampling sequence, a number of samples being at least four times a numerical value of the analysis target frequency; generating evaluation diagnosis data based on variations in characteristics corresponding to the analysis target frequency by subjecting the evaluation time series data to frequency analysis; and determining the life span of the rotary machine using the evaluation diagnosis data.

A second aspect of the present invention inheres in a method for predicting life span of a rotary machine used in a manufacturing apparatus, includes: measuring reference time series data of an acceleration of the rotary machine and evaluation time series data of the acceleration respectively, with a sampling interval being less than a half of the reciprocal of an analysis target frequency, a number of samples being at least four times a numerical value of the analysis target frequency or more; generating reference diagnosis data based on variations in characteristics corresponding to the analysis target frequency by subjecting the reference time series data to a frequency analysis; generating evaluation diagnosis data based on variations in a peak value by subjecting the evaluation time series data to the frequency analysis; and determining the life span of the rotary machine using the reference diagnosis data and the evaluation diagnosis data.

A third aspect of the present invention inheres in a life predicting system, includes: a rotary machine; an accelerometer for sampling and measuring evaluation time series data for an acceleration of the rotary machine with a sampling interval being less than a half of the reciprocal of an analysis target frequency, a number of samples being at least four times a numerical value of the analysis target frequency or more; a frequency analysis device for performing a frequency analysis on an output from the accelerometer; a peak acceleration transition recording module for generating evaluation diagnosis data based on variations in characteristics corresponding to the analysis target frequency from the evaluation time series data using results of the frequency analysis, and recording the evaluation diagnosis data; and a life span determination unit for determining life span of the rotary machine using the evaluation diagnosis data.

A fourth aspect of the present invention inheres in a life predicting system, includes: a rotary machine; an accelerometer for sampling and measuring reference time series data for an acceleration of the rotary machine and evaluation time series data of the acceleration respectively, with a sampling interval being less than a half of the reciprocal of an analysis target frequency, a number of samples being at least four times a numerical value of the analysis target frequency or more; a frequency analysis device for performing a frequency analysis on an output from the accelerometer; a peak acceleration transition recording module for generating reference diagnosis data based on variations in a peak value of acceleration corresponding to the analysis target frequency from the reference time series data, generating evaluation diagnosis data based on variations in a peak value from the evaluation time series data, with results of the frequency analysis, and recording the reference diagnosis data and the evaluation diagnosis data; and a life span determination unit for determining life span of the rotary machine using the reference diagnosis data and the evaluation diagnosis data.

BRIEF DESCRIPTION OF DRAWINGS

FIG. 14 is a flowchart for showing a life span prediction method for a rotary machine used in the semiconductor manufacturing apparatus according to the third embodiment of the present invention.

DETAILED DESCRIPTION OF THE INVENTION

Figure 1:
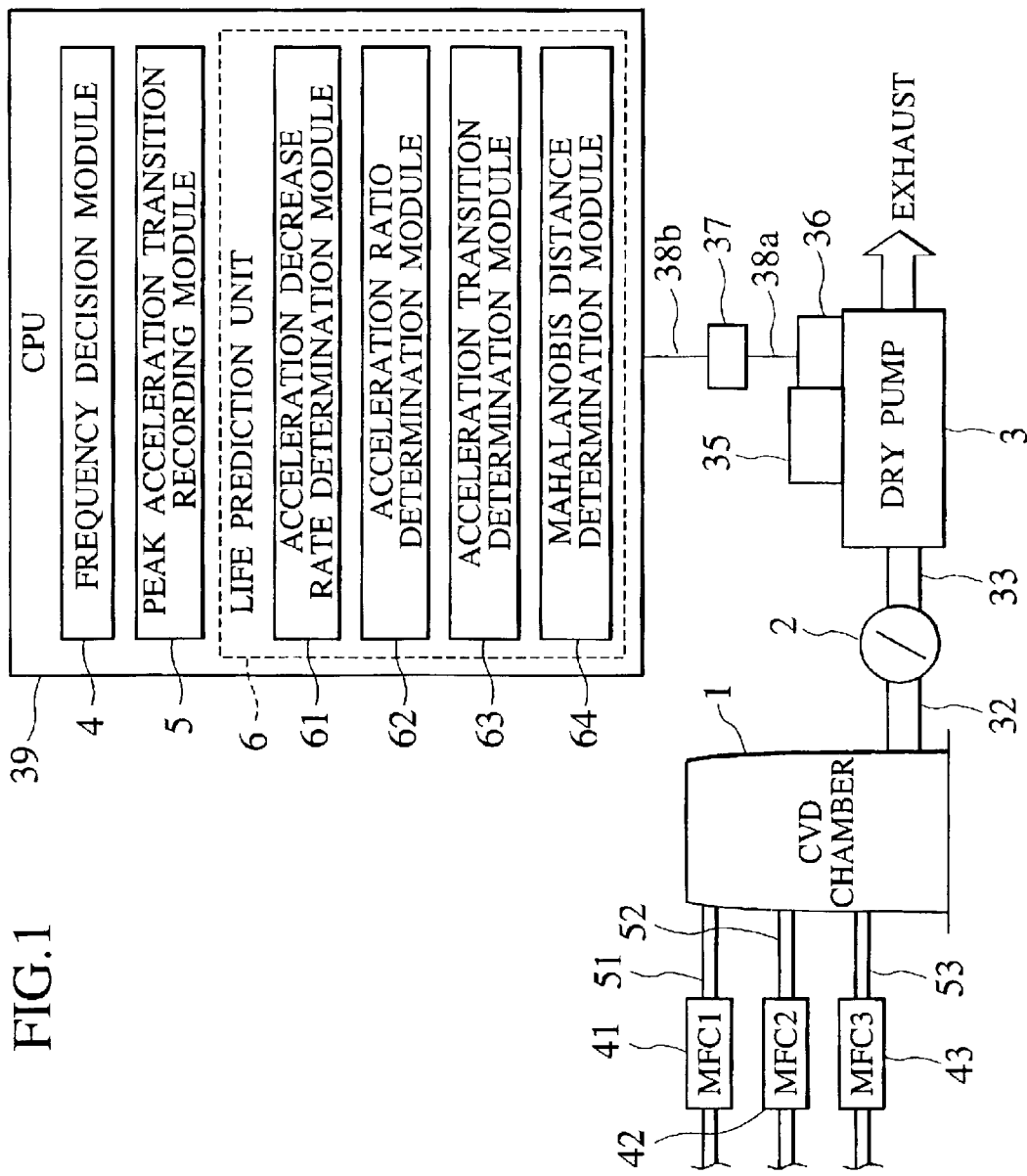
FIG. 1 is a schematic diagram of a semiconductor manufacturing apparatus according to a first embodiment of the present invention.

Various embodiments of the present invention are described herein with reference to the accompanying drawings. It is to be noted that the same or similar reference numerals are applied to the same or similar parts and elements throughout the drawings, and the description of the same or similar parts and elements will be omitted or simplified.

(First Embodiment)

FIG. 1 is a schematic diagram of a LPCVD apparatus, which is used as a semiconductor manufacturing apparatus, according to a first embodiment of the present invention. As shown in FIG. 1, the LPCVD apparatus has a CVD chamber 1 which has an air-tight structure capable of vacuum evacuation, wherein a vacuum piping 32 is connected to the exhaust side of the CVD chamber 1, and a gate valve 2 is connected to the exhaust side of the vacuum piping 32. In addition, a vacuum piping 33 is connected to the exhaust side of the gate valve 2, and a rotary machine (a Roots-type dry pump) 3 is connected to the exhaust side of the vacuum piping 33 in order to evacuate the CVD chamber 1. The gate valve 2 separates the CVD chamber 1 and the dry pump 3 and adjusts exhaust conductance, if necessary. Meanwhile, a plurality of gas pipings 51, 52, 53, . . . is connected to the CVD chamber 1, and this gas piping 51, 52, 53 . . . is connected to mass flow controllers 41, 42, and 43, respectively. The flow of the various source gases and carrier gas introduced into the CVD chamber 1, is controlled by the mass flow controllers 41, 42, and 43. In addition, the controlled source gases and the like are introduced into the CVD chamber 1 under low-pressure conditions via the gas pipings 51, 52, 53 and so on.

The dry pump 3 is used for evacuating non-reacted source gases and reaction by-products introduced into the CVD chamber 1. For example, in the case of depositing a silicon nitride film ($Si_3N_4$ film) using the LPCVD apparatus shown in FIG. 1, dichlorosilane ($SiH_2Cl_2$) gas and ammonia ($NH_3$) gas are respectively introduced via the mass flow controllers 41 and 42 into the CVD chamber 1 under low-pressure conditions evacuated by the dry pump 3. Inside the CVD chamber 1, a silicon (Si) substrate is then heated to approximately 800° C., and by the chemical reaction of the dichlorosilane gas and ammonia gas, a silicon nitride film is deposited upon the silicon substrate. In addition to generating the silicon nitride film, this chemical reaction produces the reaction by-products of ammonium chloride ($NH_4Cl$) gas and hydrogen ($H_2$) gas. Since hydrogen is a gaseous body, it can be evacuated through the dry pump 3. On the other hand, since the temperature within the reactor is approximately 800° C. and it is under low-pressure of approximately several 100 Pa or less at the time of formation, the ammonium chloride is also a gas. While it is omitted from the drawings, the LPCVD apparatus typically has a trap disposed between the CVD chamber 1 and dry pump 3 for collecting solid reaction by-product. With this trap, it is impossible to completely collect the reaction by-product under low-pressure conditions. Accordingly, any reaction by-product that is not collected reaches the dry pump 3. Pressure in the dry pump 3 increases from approximately 0.1 Pa to normal atmospheric pressure due to the compression of the gas. The reaction by-product is in a gas phase under low-pressure conditions, and begins to solidify as pressure increases. Within the dry pump 3, since the pressure changes from several 100 Pa of pressure to normal atmospheric pressure by repeating the compression of the gas, the gaseous reaction by-product within the exhaust gas begins to solidify in the dry pump 3 as the pressure increases. If solidification begins in the piping of the dry pump 3, although it is a minute amount, the deposited material causes elastic deformation of a rotational axis of the dry pump 3. This effect results in dry pump failure.

The Roots-type dry pump (rotary machine) 3 used in the semiconductor manufacturing apparatus (LPCVD apparatus) according to the first embodiment of the present invention, as shown in FIG. 1, includes a gear box 35, and an accelerometer 36 for detecting vibration is provided near this gear box 35. The accelerometer 36 may be located on either a top surface of the gear box 35 of the dry pump 3, a side surface of this gear box 35, or on a bottom surface of the gear box 35. Alternatively, it may be placed either on a top surface of a casing (not shown in the figures) within 20 cm from the gear box 35, a side surface of the casing, or a bottom surface of the casing. Moreover, a frequency analysis device 37, such as a Fourier transform/analysis device, is connected to the output side of the accelerometer 36. This frequency analysis device 37 subjects the vibration (acceleration) of the rotary machine (dry pump) 3 that has been sampled and measured by the accelerometer 36 to a Fourier transform and decomposes it into frequency components. Accordingly, wiring 38a is provided for transmitting data measured by the accelerometer 36 to the Fourier transform device 37. The frequency spectrum data which the vibration (acceleration) time series data has been decomposed into frequency components by the frequency analysis device (Fourier transformation/analysis device) 37 is transmitted to the CPU 39 via the wiring 38b.

Frequency decision module 4, peak acceleration transition recording module 5, and life span prediction unit 6 are installed in the CPU 39. The frequency decision module 4 analyzes the frequency spectrum data transmitted to the CPU 39 and decides the frequency to be analyzed according to the frequency where a spectral peak is located. The peak acceleration transition recording module 5 records the analysis target frequency component of the sampled and measured acceleration in a file in the main storage unit of the CPU or an external storage device not shown in the figures. Namely, with the results of the frequency analysis of the Fourier transform device 37, variations in the peak value of acceleration corresponding to the analysis target frequency are used to generate reference diagnosis data from reference time series data and variations in the peak value are used to generate evaluation diagnosis data from evaluation time series data. The reference diagnosis data and the evaluation diagnosis data are recorded in the main storage unit or the external storage device.

With the life span prediction unit 6, the data groups recorded by the peak acceleration transition recording module 5 are read out and life span is determined for the dry pump 3 by calculation.

More specifically, the life span prediction unit 6 of the semiconductor manufacturing apparatus according to the first embodiment includes four modules: acceleration decrease rate determination module 61, acceleration ratio determination module 62, acceleration transition determination module 63, and Mahalanobis distance determination module 64. The acceleration decrease rate determination module 61 calculates a rate of decrease in acceleration during a CVD process (the film deposition step) and determines the life span of the dry pump 3. The acceleration ratio determination module 62 calculates the acceleration ratio before and after the film deposition step during the CVD process and determines the life span of the dry pump 3. The acceleration transition determination module 63 determines the life span of the dry pump 3 using the history (time series data) of peak acceleration in a case where the gas flow into the dry pump 3 is fixed, for example in a standby mode. The Mahalanobis distance determination module 64 is a module that generates a reference space (Mahalanobis space) from the peak acceleration data group in the case where the gas flow into the pump is fixed, for example in standby mode, calculates the Mahalanobis distance using this reference space, and determines the life span of the dry pump 3 with variations in the Mahalanobis distance.

Figure 2:
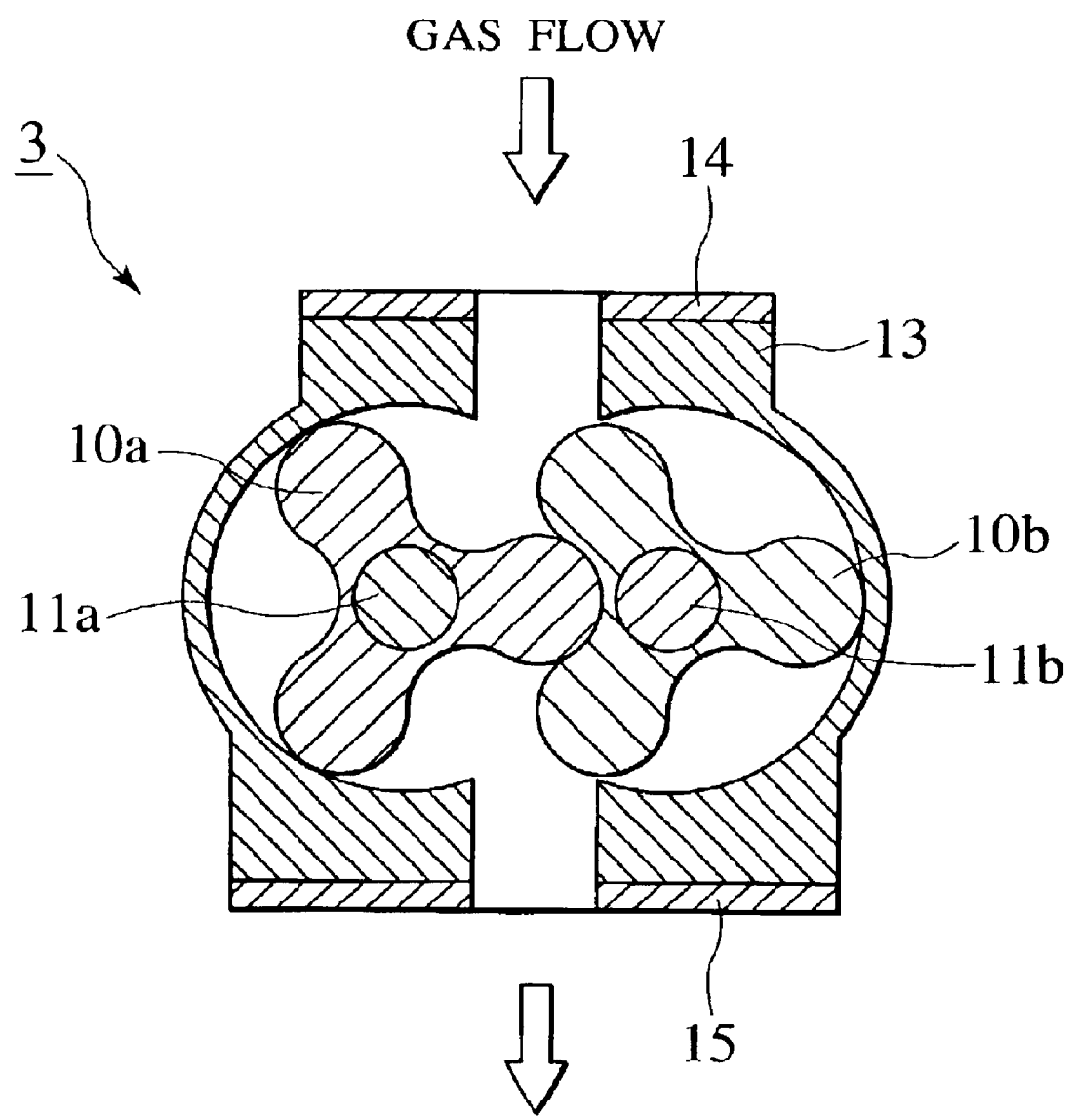
FIG. 2 is a cross-sectional diagram showing the internal configuration of a dry pump as a rotary machine shown in FIG. 1.

FIG. 2 shows an internal configuration of the Roots-type dry pump (rotary machine) 3 shown in FIG. 1. As shown in FIG. 2, the dry pump 3 used in the LPCVD apparatus according to the first embodiment is constructed with two three-bladed rotors 10a and 10b, which rotate around rotational axes 11a and 11b, respectively. The dry pump 3 includes a body 13, a suction flange 14 provided on a suction side of the body 13, and an exhaust flange 15 provided on an exhaust side of the body 13. Although it is not shown, in FIG. 2 the gear box 35 shown in FIG. 1 converts an output power of a motor for driving the two rotors 10a and 10b and controls the rotation of the two rotors 10a and 10b. The accelerometer 36 is attached, for example to a planar portion of the top portion of the gear box 35 with a magnet. The attachment of the accelerometer 36 may be held in place onto the gear box 35 by means of a chemical module such as an adhesive, or by means of a mechanical module such as with screws or being embedded. The gas flow coming from the CVD chamber 1 via the gate valve 2 enters the dry pump 3 through the suction flange 14. The gas that enters the dry pump 3 is compressed through the rotation of the two rotors 10a and 10b around the rotational axes 11a and 11b. The compressed gas is evacuated through the exhaust flange 15.

Figure 3:
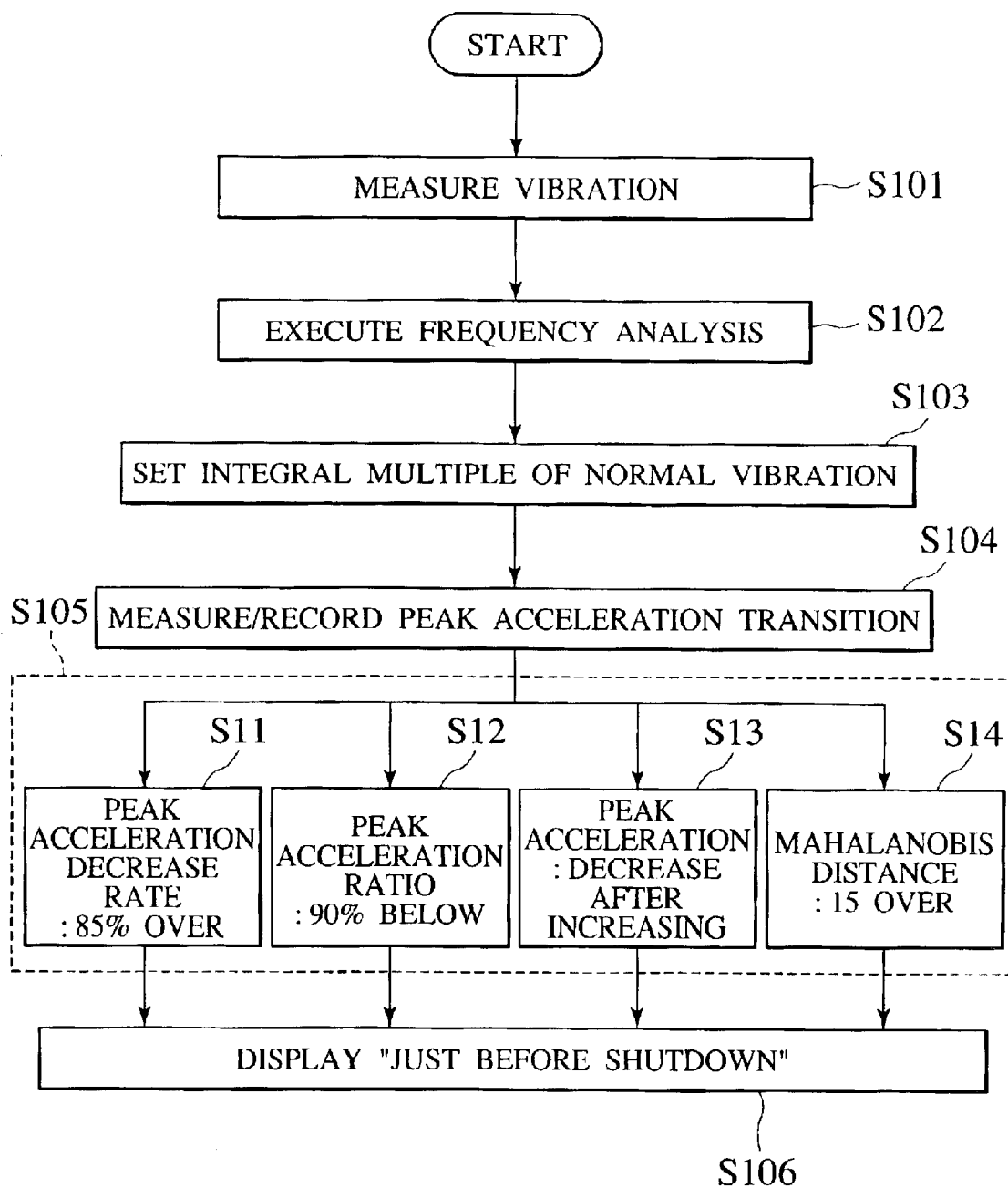
FIG. 3 is a flowchart for showing a life span prediction method for a rotary machine used in the semiconductor manufacturing apparatus according to the first embodiment of the present invention.

Next, using the flowchart shown in FIG. 3, a life span prediction method for a rotary machine used in semiconductor manufacturing apparatus (LPCVD apparatus) according to the first embodiment of the present invention is described. The rotary machine here is the dry pump 3. More specifically, the life span is predicted for a dry pump 3 utilized in LPCVD apparatus that forms a $Si_3N_4$ thin film.

(a) To begin with, in step S101, the vibration (acceleration) time series data representing a transition of the dry pump 3 is sampled and measured by the accelerometer 36 located on the dry pump 3 of the LPCVD apparatus. Measurement of the acceleration time series data involves sampling of a predetermined number of accelerations at a predetermined time interval.

(b) Next in step S102, the vibration data obtained in step S101 is used to obtain an acceleration frequency spectrum which is decomposed into frequency components by the frequency analysis device (Fourier transform/analysis device) 37. After Fourier transformation, the acceleration frequency spectrum is then displayed on a display device such as a CRT, or LCD; alternatively, the acceleration frequency spectrum is output using an output device such as a printer.

Figure 4:
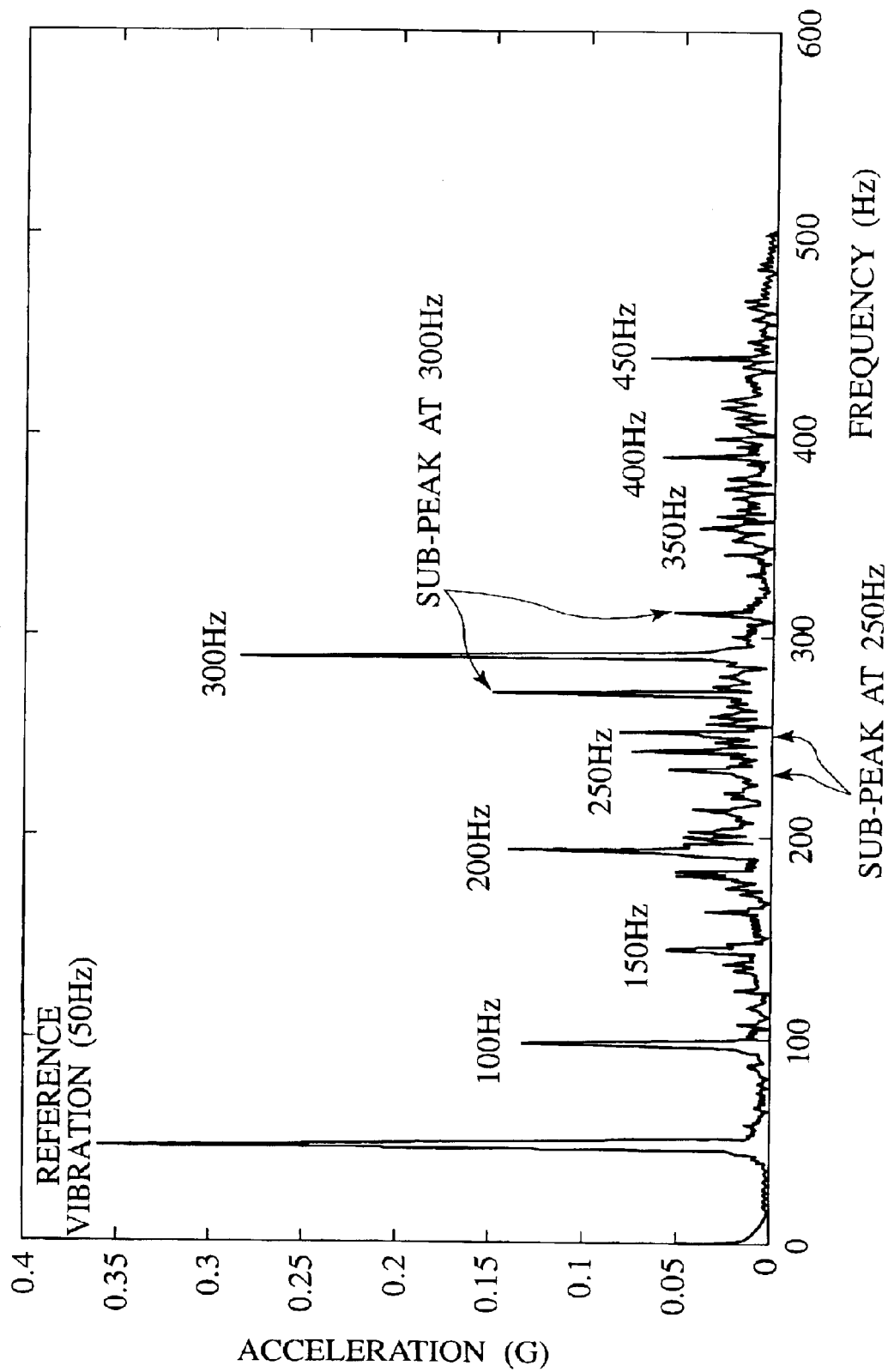
FIG. 4 is a graph showing the frequency spectrum of the vibration acceleration.

(c) In the dry pump 3 shown in FIG. 2, the rotational axes 11a and 11b rotate at 50 Hz, and since the rotors 10a and 10b each have three blades, one rotation of the rotational axes 11a and 11b involves the passing of a blade six times past an arbitrary point. Accordingly, as shown in FIG. 4, a maximum peak value for acceleration appears at near 300 Hz, which is 6 times the reference vibration. In other words, a maximum acceleration peak in the frequency spectrum is determined by the reference vibration of the rotational axes 11a and 11b and the number of rotor blades. In the case of the dry pump 3 with the reference vibration of 50 Hz, acceleration peaks appear throughout the frequency spectrum at integral multiples of 50 Hz. In step S103, an analysis target frequency to be used for life span determination is determined considering the frequency spectrum for acceleration using the frequency decision module 4 of the CPU 39. As clearly shown by FIG. 4, it is preferable that a frequency located at every peak of an integral multiple the reference vibration be used for the analysis target frequency. Therefore, with the first embodiment, the analysis target frequency is given as 300 Hz. The life span of the dry pump 3 can be sensitively predicted by using the peak acceleration value corresponding to the analysis target frequency. The frequency showing the peak acceleration does not always stay at the analysis target frequency but shows fluctuation or variation in the vicinity of the analysis target frequency. That is to say, the frequency showing the peak acceleration is typically a variable.

(d) Thereafter, the acceleration time series data is sampled and measured, a Fourier transformation is used to convert the time series data into frequency domain data, and an acceleration peak value corresponding to the analysis target frequency component is obtained. Namely, first the reference time series data of the acceleration of the rotary machine and then evaluation time series data of the acceleration are respectively sampled and measured. The data sampling method is key to capturing the variation of the acceleration peak value with high sensitivity when the analysis target frequency is an integral multiple of the reference vibration. With the life span prediction method according to the first embodiment of the present invention, it is assumed that the acceleration sampling interval is no greater than half the reciprocal of the maximum analysis target frequency and the number of samples is at least four times the numerical value of the maximum analysis target frequency. For example, if the maximum analysis target frequency is given as 450 Hz, then there should be at least 4×450=1800 samples. Sampling and measuring including this predetermined number of sampling points is considered as one sampling sequence, and sampling measurement is repeated at a predetermined diagnostic time intervals. For example, if the sampling interval is 0.5 ms within a single sampling sequence, then there are 4000 samples taken in a single sampling sequence and acceleration is sampled and measured at 4000 points. The reference time series data is then subjected to frequency analysis, the variation in the acceleration peak value corresponding to the analysis target frequency is used to generate the reference diagnosis data, the evaluation time series data is subjected to frequency analysis, and the variation in the peak value is used to generate the evaluation diagnosis data. A single diagnosis point of reference diagnosis data and evaluation diagnosis data is obtained from the 4000 sample points in the single sampling sequence. Selecting the sampling interval and number of samples makes highly sensitive prediction possible. In step S104, using the peak acceleration transition recording module 5, the reference diagnosis data and evaluation diagnosis data, which are data for a diagnosis point group including the analysis target frequency component for acceleration, are then recorded in a file in the storage unit. Here, data for a diagnosis point group including the acceleration analysis target frequency component measured during a film deposition step in the LPCVD apparatus is recorded in a file in the storage unit as input data for the acceleration decrease rate determination module 61. In addition, data for a diagnosis point group including the acceleration analysis target frequency component measured before and after the film deposition step is recorded in a file in the storage unit as input data for the acceleration ratio determination module 62. Moreover, data for a diagnosis point group including the acceleration analysis target frequency component occurring under conditions other than the LPCVD process is recorded in a file in the storage unit as input data for the acceleration transition determination module 63. Moreover, data for a diagnosis point group composed with the analysis target frequency component, including the data group from in standby mode (under identical gas flow conditions) occurring 72 hours prior (between 48 hours prior and 168 hours prior is acceptable) to the day when evaluation of the status of the dry pump 3 is to be made, is recorded in a file in the storage unit as input data for the Mahalanobis distance determination module 64.

(e) In step S105, the evaluation diagnosis data and reference diagnosis data, i.e. the diagnosis point data group, composed with the acceleration analysis target frequency component recorded in step S104, which is an acceleration peak value data group, are read out, and using the acceleration decrease rate determination module 61, acceleration ratio determination module 62, acceleration transition determination module 63, and Mahalanobis distance determination module 64, the life span of the dry pump 3 is determined.

1. In step S11, using the acceleration decrease rate determination module 61, the life span of the dry pump 3 is determined utilizing conditions where the peak acceleration decreases during the film deposition step. The situation where the peak acceleration decrease rate is at 85% or greater during the film deposition step is determined to be just before shutdown or the end of the life span of the dry pump 3. The pump acceleration decrease rate is described in more detail below, referring FIG. 5 and FIG. 6.

2. In step S12, before and after the film deposition step, the peak acceleration ratio is calculated using the acceleration ratio determination module 62. More specifically, immediately after the film deposition step during the LPCVD process, the 300 Hz peak acceleration that has decreased during the film deposition step returns to a value from before the film deposition step under normal conditions. However, just before shutdown of the dry pump 3, it does not return to the value from before the film deposition step and this phenomenon is utilized to determine the life span of the dry pump 3. The situation where the peak acceleration ratio after and before the film deposition step is at 90% or less is determined to be just before pump shutdown or the end of the life span of the dry pump 3. The peak acceleration ratio before and after the film deposition step is described in more detail below, referring FIG. 7 and FIG. 8.

3. In step S13, temporal change of a diagnosis point (change in the peak acceleration) occurring under conditions other than the LPCVD process is found using the acceleration transition determination module 63. The inventors confirmed through testing that the peak acceleration sampled and measured other than the LPCVD process and subjected to frequency analysis changes experiences due to the buildup of deposition inside the dry pump 3. In addition, the fixed peak acceleration just after pump exchange increases before the predetermined day of pump shutdown and decreases just before shutdown (see FIG. 9). More specifically, it is determined that the life span of the dry pump 3 is approaching when the peak acceleration decreases after increasing in cases where the gas flow into the dry pump 3 is constant, for example in standby mode. In particular, since the acceleration measurement time may be completed in a short period of time, the life span of the dry pump 3 may be efficiently predicted.

4. In step S14, the life span of the dry pump 3 is determined by calculating the Mahalanobis distance using the Mahalanobis distance determination module 64. With the Mahalanobis distance determination module 64, data in a normal mode for which homogeneity can be anticipated is collected to generate a space that becomes a reference for recognition, namely a Mahalanobis space (normal space). In other words, when characteristics (acceleration) are measured under normal conditions, it is anticipated that the characteristics (acceleration) are relatively homogeneous. Since the set of acceleration data under the normal conditions forms the space to become a reference for measurement and has a certain correlation, the Mahalanobis space is represented by the inverse matrix of the correlation matrix derived from a set of data.

The "Mahalanobis distance (MD)" is a measure indicating the degree of abnormality in acceleration data to be measured, that is, indicating how deviant measured acceleration data is from the acceleration data (during normal conditions) providing a reference for measurement. The MD takes a value between zero and infinity. If the value is small, it may be determined as a group of normal data; whereas if the value is large, the probability of abnormality is high, and therefore it is determined that remaining life span may be short. Nevertheless, the way in which the reference space (Mahalanobis space) is found is key to using changes in the MD to determine life span. With the life span prediction method of the rotary machine used in semiconductor manufacturing apparatus according to the first embodiment of the present invention, in order to eliminate the effects of process variations, the reference space (Mahalanobis space) is generated from an acceleration data group in standby mode (constant gas flow conditions) 72 hours prior to the measurement of the data group for evaluating the condition of the dry pump 3. Using this reference space, the MD is calculated, and variations in the MD at each time point are investigated. In addition, it is determined that the MD is 15 or higher just before shutdown of the dry pump 3. When the MD is used, sensitivity is improved even further.

(f) Then in step S106, based on the determination of step S10S, an indication showing that the pump is just about to shutdown (life span) is displayed on a display device, display panel or with a display lamp. Alternatively, an audio indication such as a warning signal may be given.

It should be noted that each the above steps S11 through S14 may independently determine the life span of the dry pump 3, however, a combination of two or more steps allows for a more comprehensive determination. In the case where any of the above mentioned steps S11 through S14 are performed independently, only the corresponding module, of the four modules of the acceleration decrease rate determination module 61, acceleration ratio determination module 62, acceleration transition determination module 63, and Mahalanobis distance determination module 64, may be included in the life span prediction unit 6 shown in FIG. 1. In addition, if a determination is to be made by combining the modules, it is natural that at least two of the modules required for combination are needed from the acceleration decrease rate determination module 61, acceleration ratio determination module 62, acceleration transition determination module 63, and Mahalanobis distance determination module 64. In the above description, the case of life span prediction of the dry pump 3 using the maximum peak acceleration in a frequency spectrum is given as an example. Alternatively, other peak accelerations or sub-peak accelerations may also be used. FIG. 4 is a graph showing the frequency spectrum of the vibration acceleration. The vertical axis shows the acceleration measured with the accelerometer 36 disposed in the dry pump 3, and the horizontal axis shows frequency. As shown in FIG. 4, acceleration peaks may be seen at a plurality of frequencies. In the case where the three-bladed dry pump 3 has the reference vibration of 50 Hz, an acceleration frequency of six times the reference vibration becomes particularly sensitive for the condition of the dry pump 3. Accordingly, acceleration having the maximum peak value is obtained at a frequency of 300 Hz. In other words, it is most rational to use the peak acceleration at 300 Hz as the analysis target frequency to perform life span prediction for the dry pump 3. However, life span may also be determined using the integral multiple frequency peaks of other reference vibrations as the analysis target frequency. Moreover, in FIG. 4, the sub peaks of 250 Hz and 300 Hz may be seen at 10 Hz to the high frequency side and low frequency side, respectively, of the 250 Hz and 300 Hz peaks. These sub peaks may also be used as the analysis target frequency to determine life span.

Figure 5:
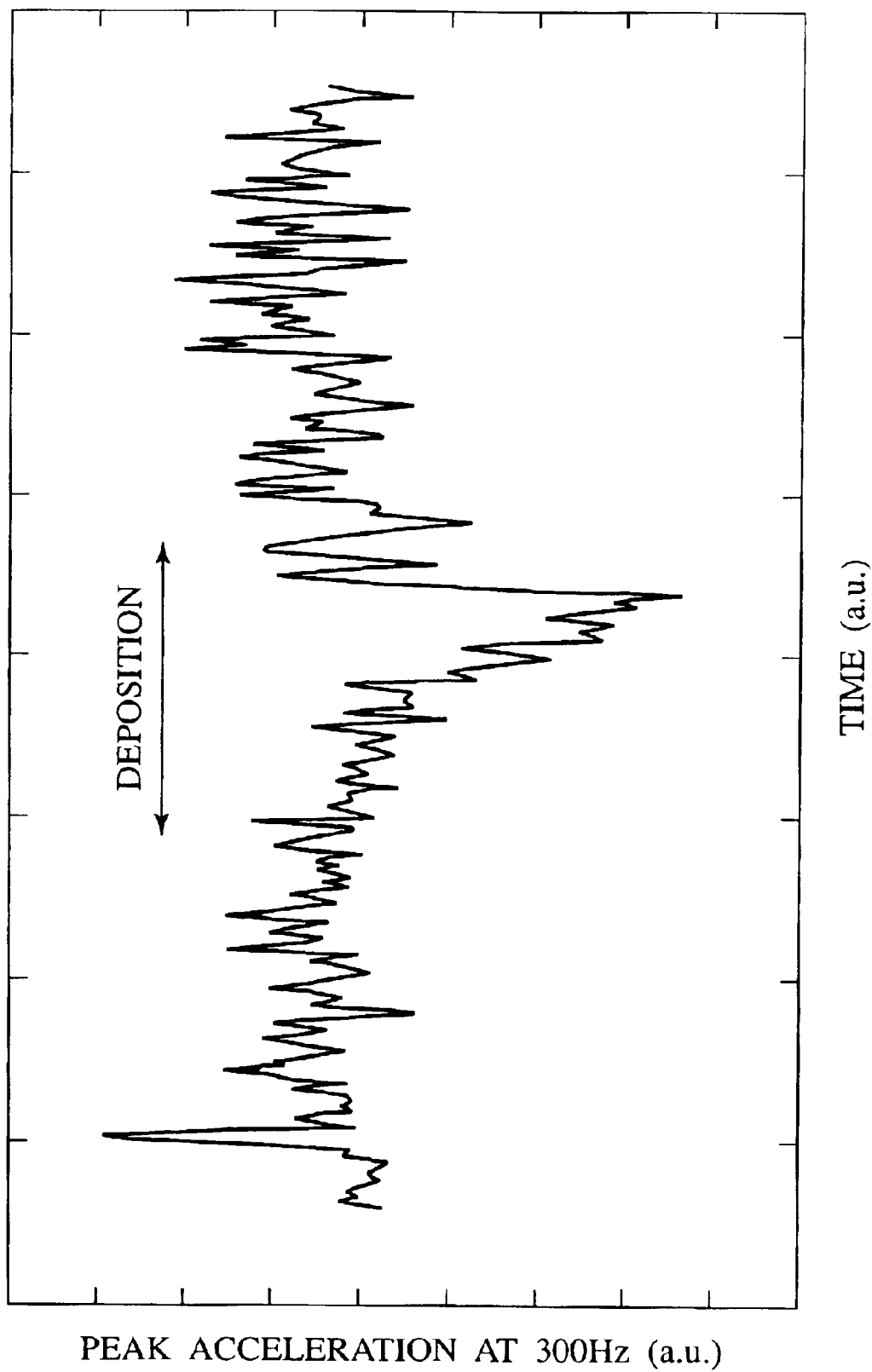
FIG. 5 is a graph showing the change over time of the peak acceleration during a film deposition step.
Figure 6:
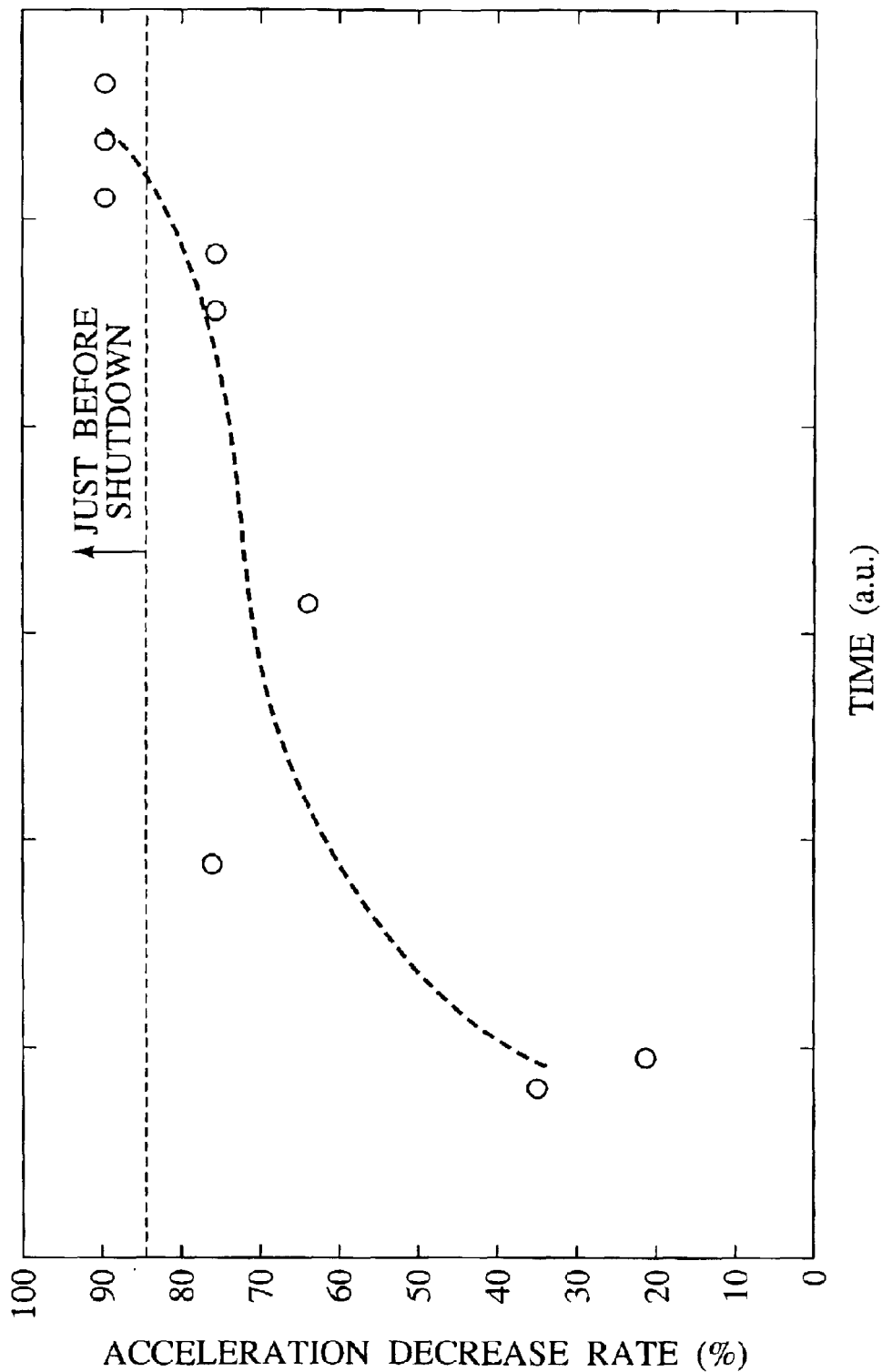
FIG. 6 is a graph showing the change over time of the peak acceleration decrease rate during a film deposition step.

FIG. 5 is a graph showing change over time of the peak acceleration during a film deposition step. The vertical axis represents the peak acceleration at 300 Hz and the horizontal axis represents the passage of time during a LPCVD process. According to FIG. 5, the phenomena where the peak acceleration drops during the film deposition step in the LPCVD process may be verified. Therefore the acceleration decrease rate when the peak acceleration drops during the film deposition step shown in FIG. 5 is found and is shown in FIG. 6. FIG. 6 is a graph showing the change over time of the peak acceleration decrease rate during the film deposition step. The vertical axis represents the peak acceleration decrease rate during the film deposition step and the horizontal axis represents the time. The peak acceleration decrease rate shows a tendency to increase as the accumulated film thickness increases. The end of the life span of the dry pump 3 is given as being when the acceleration decrease rate is 85% or higher. Accordingly, when the acceleration decrease rate is 85% or higher, the dry pump 3 may be determined as being in a state just before shutdown.

Figure 7:
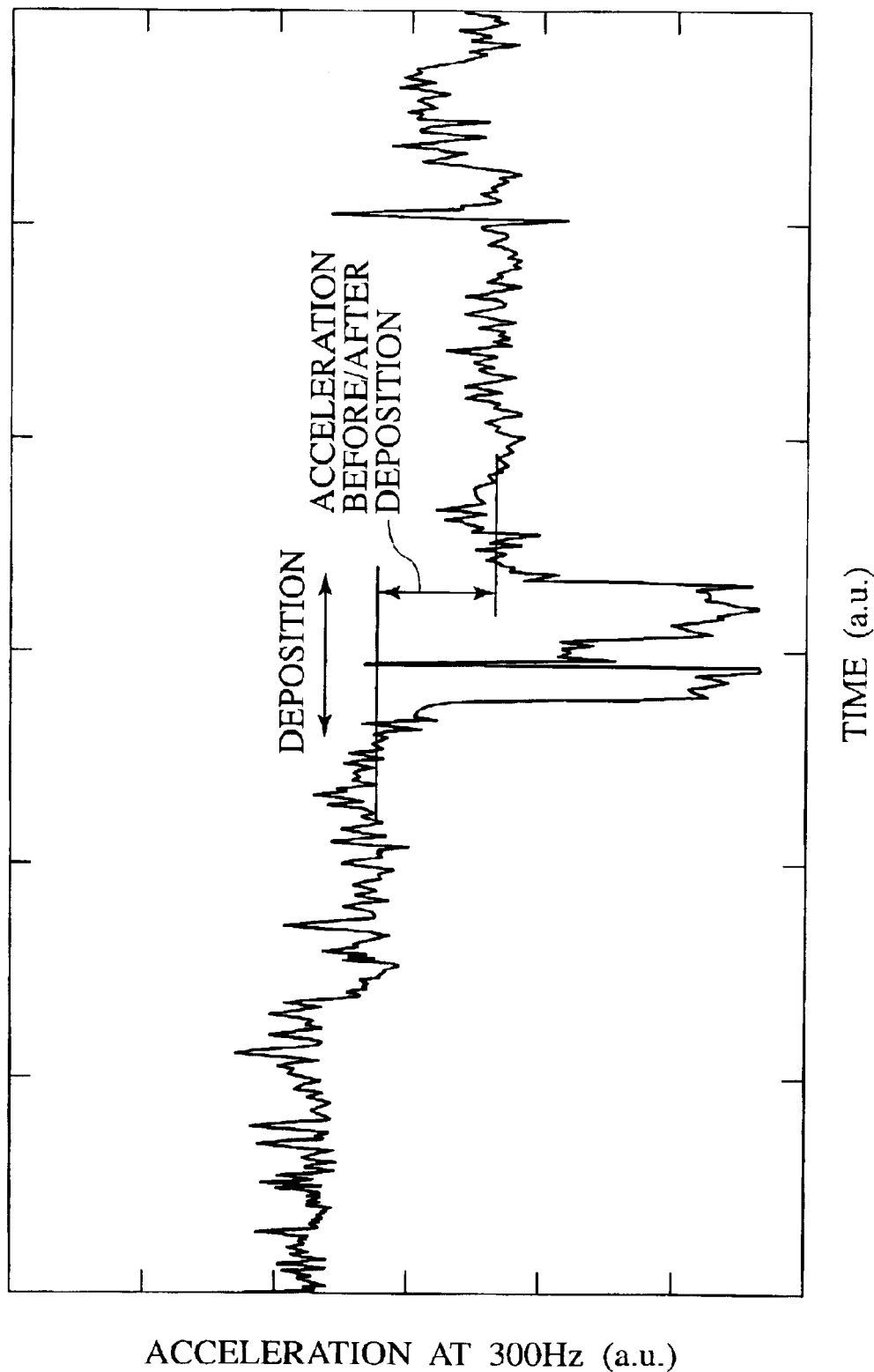
FIG. 7 is a graph showing the change over time of the peak acceleration during a film deposition step just before shutdown.

FIG. 7 is a graph showing the change over time of the peak acceleration during a film deposition step just before shutdown. The vertical axis represents the peak acceleration at 300 Hz and the horizontal axis represents the time during the film deposition step. Just after the film deposition step in LPCVD, the peak acceleration at 300 Hz that has decreased during the film deposition step returns to the value from before the film deposition step under normal conditions, as shown in FIG. 5. However, just before shutdown of the dry pump 3, the phenomenon just before shutdown where the peak acceleration does not return to the value from before the film deposition step is shown in FIG. 7.

Figure 8:
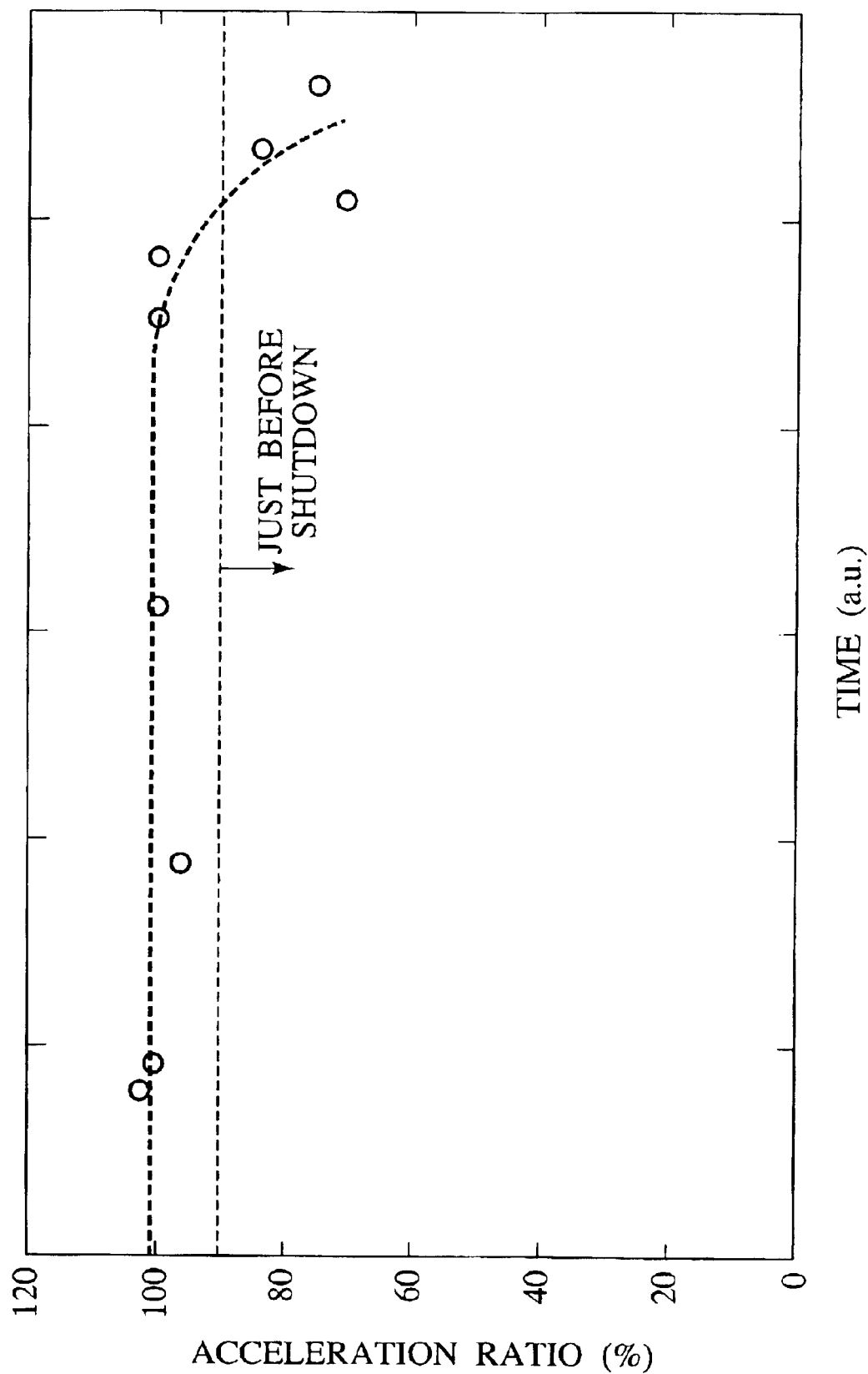
FIG. 8 is a graph showing the transition of the peak acceleration before and after a film deposition step.

FIG. 8 is a graph showing the change over time in the acceleration ratio of a second peak acceleration to a first peak acceleration, wherein the first peak acceleration is used to obtain reference diagnosis data from the reference time series data before the film deposition step, and the second peak acceleration is used to obtain evaluation diagnosis data from the evaluation time series data after the film deposition step. The vertical axis represents the before/after film deposition step peak acceleration ratio (after/before). The horizontal axis represents time. As shown in FIG. 7, just before shutdown, the peak acceleration does not return to the value from before film deposition step just before shutdown. Meanwhile, the inventors found that when acceleration ratio decrease rate is 90% indicate the end of the life span of the dry pump 3. Therefore, the peak acceleration ratio decrease rate to be used as the determination reference is given as 90%. Accordingly, when the acceleration ratio decrease rate becomes 90%, the dry pump 3 may be determined as being about to shutdown.

Figure 9:
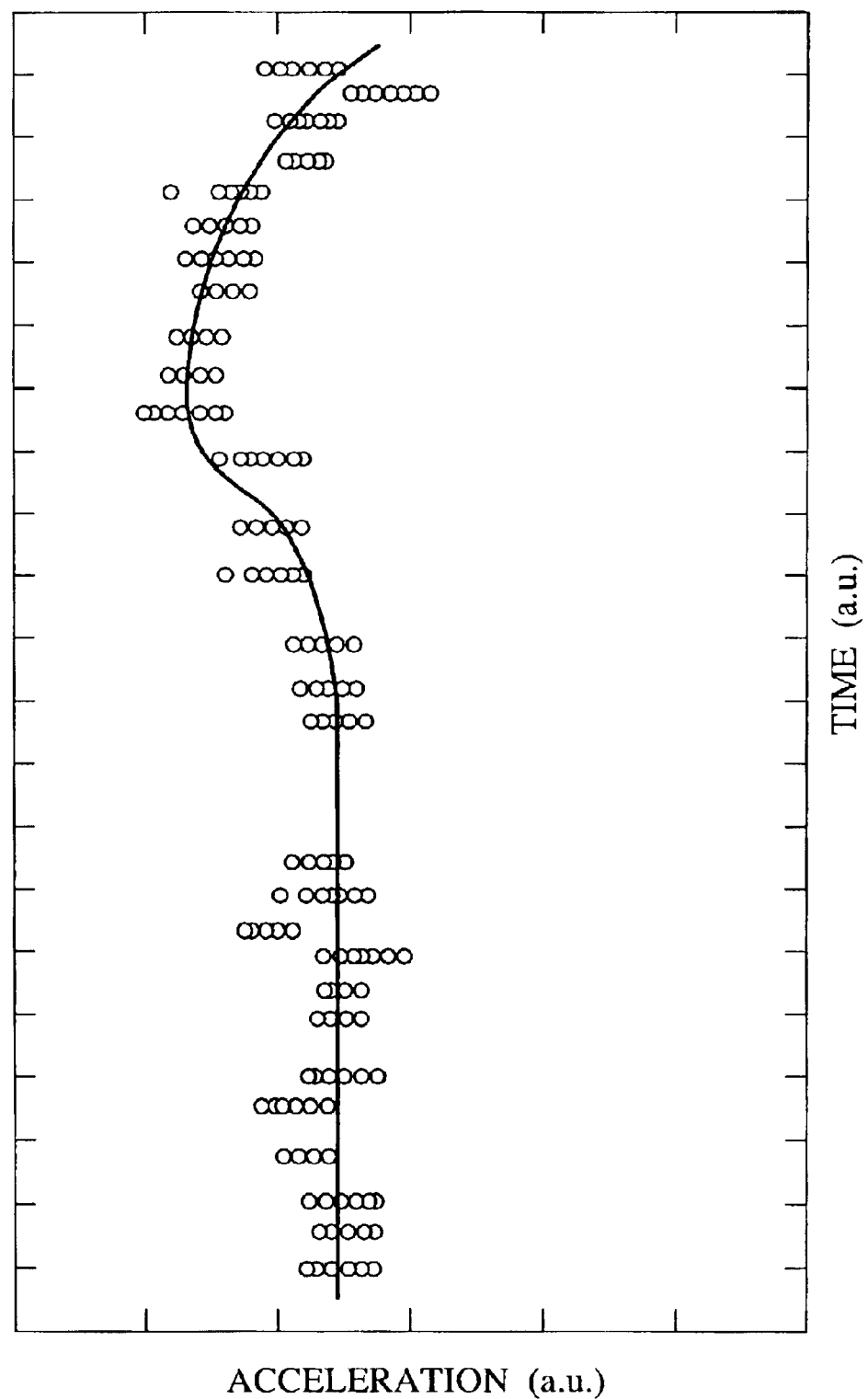
FIG. 9 is a graph showing the change over time of the peak acceleration in standby mode.

FIG. 9 is a graph showing change over time of the diagnosis point (peak acceleration) in standby mode. The vertical axis represents the peak acceleration when the gas flow into the dry pump is constant, for example in standby mode. The horizontal axis represents the time. The left-hand side end of the graph shows a stage just after pump replacement. The peak acceleration remains constant for a while. However, after a certain period of time has elapsed, the peak acceleration that had been constant begins to increase. This increase in the peak acceleration is temporary and soon begins to decrease. The inventers verified that the life span of the dry pump 3 came shortly after the change over time showed that the peak acceleration decreased after increasing. Accordingly, the change over time of the diagnosis point when the gas flow into the dry pump 3 is constant, is monitored, and when the peak acceleration begins to decrease after increasing, the dry pump 3 may be determined as being in a state just before shutdown.

Figure 10:
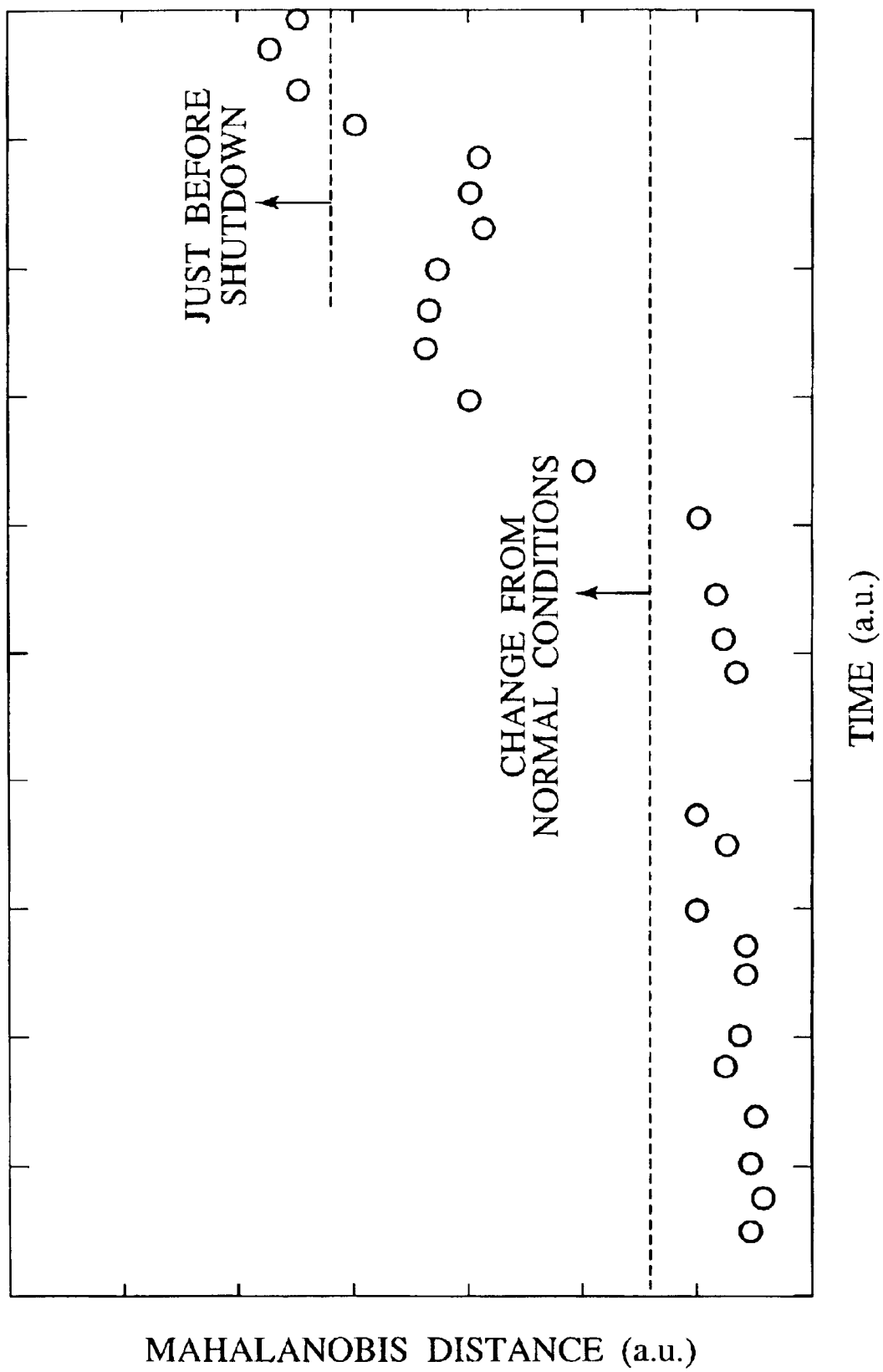
FIG. 10 is a graph showing the change over time of the MD using the peak acceleration in standby mode.

FIG. 10 is a graph showing the change over time of the MD by calculating the MD, based on a reference space (Mahalanobis space) generated from a diagnosis point (peak acceleration) data group in standby mode (constant gas flow conditions). The vertical axis represents the MD, and the horizontal axis represents time. As indicated by the results in FIG. 10, the MD increases with the progress of time. In addition, it may be determined that a change from normal conditions (transition to abnormal conditions) has occurred when the MD becomes 5 or higher. Test data has been obtained which shows that the MD continues to increase, and then immediately after the MD has reached 15 or higher, the dry pump shuts down (fails). Accordingly, in the case where the gas flow into the dry pump 3 is constant, once the MD reaches 15 or higher, the dry pump 3 may be determined as being in a state just before shutdown.

(Second Embodiment)

Figure 11:
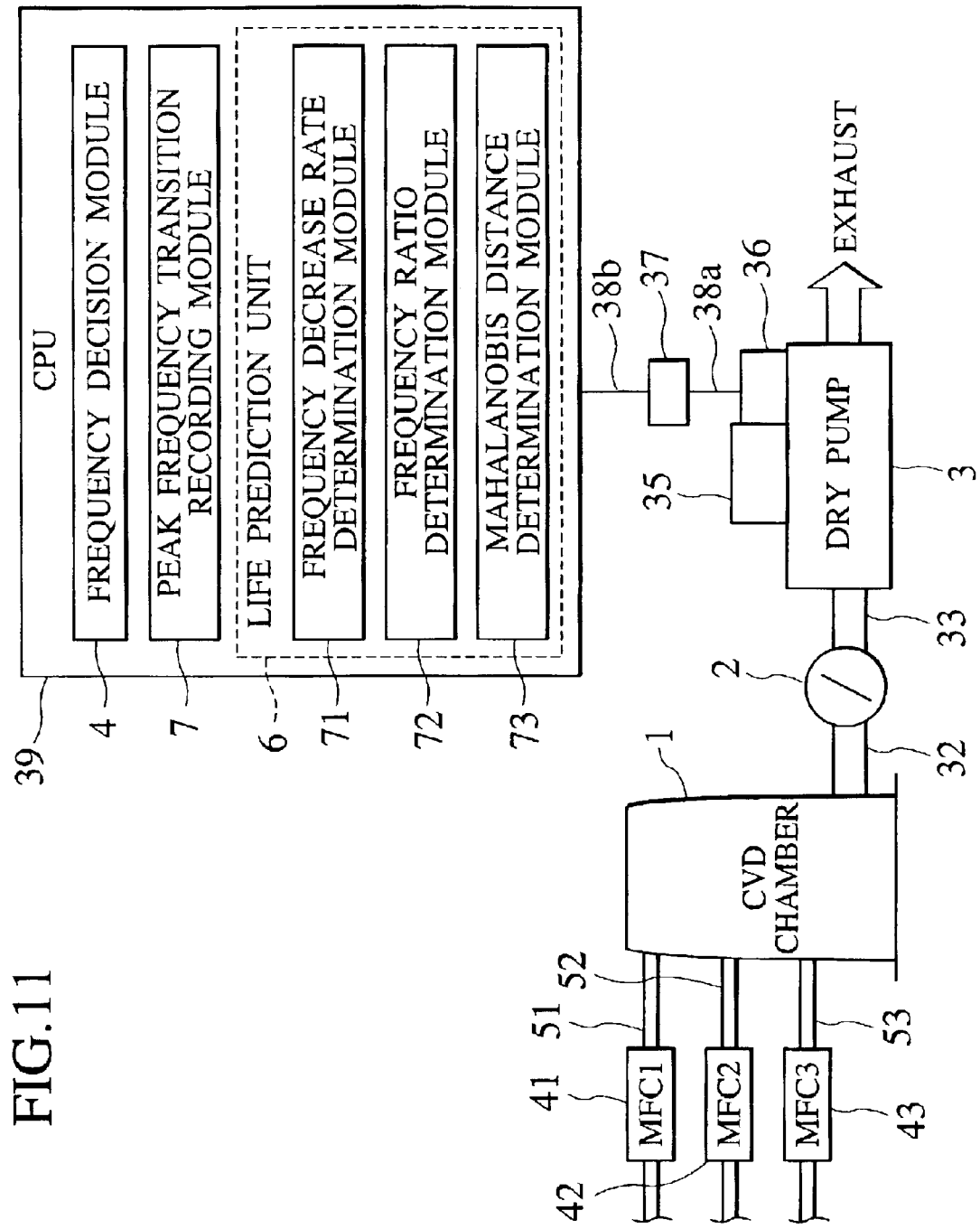
FIG. 11 is a schematic diagram of semiconductor manufacturing apparatus according to a second embodiment of the present invention.

FIG. 11 is a schematic diagram of an LPCVD apparatus, which is used as a semiconductor manufacturing apparatus, according to a second embodiment of the present invention. The frequency having the peak acceleration varies in the frequency domain near the analysis target frequency determined by the frequency decision module 4. In the second embodiment of the present invention when determining life span of the dry pump 3 used in the LPCVD apparatus, the variation in the frequency at a position showing the peak value of acceleration is used instead of the variation in the peak acceleration, that is the peak value of acceleration in the frequency domain, used in the first embodiment. Accordingly, FIG. 11 is nearly the same as FIG. 1 except for the modules installed in the CPU 39 being different. Namely, as shown in FIG. 11, the frequency decision module 4, peak frequency transition recording module 7, and life span prediction unit 6 are installed in the CPU 39. With the frequency decision module 4, as with FIG. 1, a frequency spectrum transmitted to the CPU 39 is analyzed, and the acceleration frequency showing the peak value in the frequency domain is determined as the analysis target frequency. The peak frequency transition recording module 7 records in a storage unit time series data showing variation in the frequency domain of the frequency corresponding to the peak value. Namely, with the results of the frequency analysis by the frequency analysis device 37, variations in the frequency showing the peak value of acceleration corresponding to the analysis target frequency are used to generate reference diagnosis data from the reference time series data, and from the evaluation time series data, variations in the frequency showing the peak value are used to generate evaluation diagnosis data. The peak frequency transition recording module 7 then records this reference diagnosis data and evaluation diagnosis data in the recording unit.

With the life span prediction unit 6, the time series data recorded by the peak frequency transition recording module 7 is read out and life span determination is performed for the dry pump 3. The life span prediction unit 6 has three modules: frequency decrease rate determination module 71, frequency ratio determination module 72, and Mahalanobis distance determination module 73. The frequency decrease rate determination module 71 is a module that determines the life span of the dry pump 3 through the rate of decrease of the frequency during the film deposition step. The frequency ratio determination module 72 is a module that determines the life span of the dry pump 3 using the before/after film deposition step frequency ratio that varies in the LPCVD process. The Mahalanobis distance determination module 73 is a module that forms a reference space (Mahalanobis space) from the peak frequency data group in the case where the gas flow into the dry pump 3 is constant, for example in standby mode on a predetermined earlier day, calculates the MD using this reference space, and determines the life span of the dry pump 3 with the variations in the MD. Since the rest is similar to FIG. 1, repetitive description is omitted.

Figure 12:
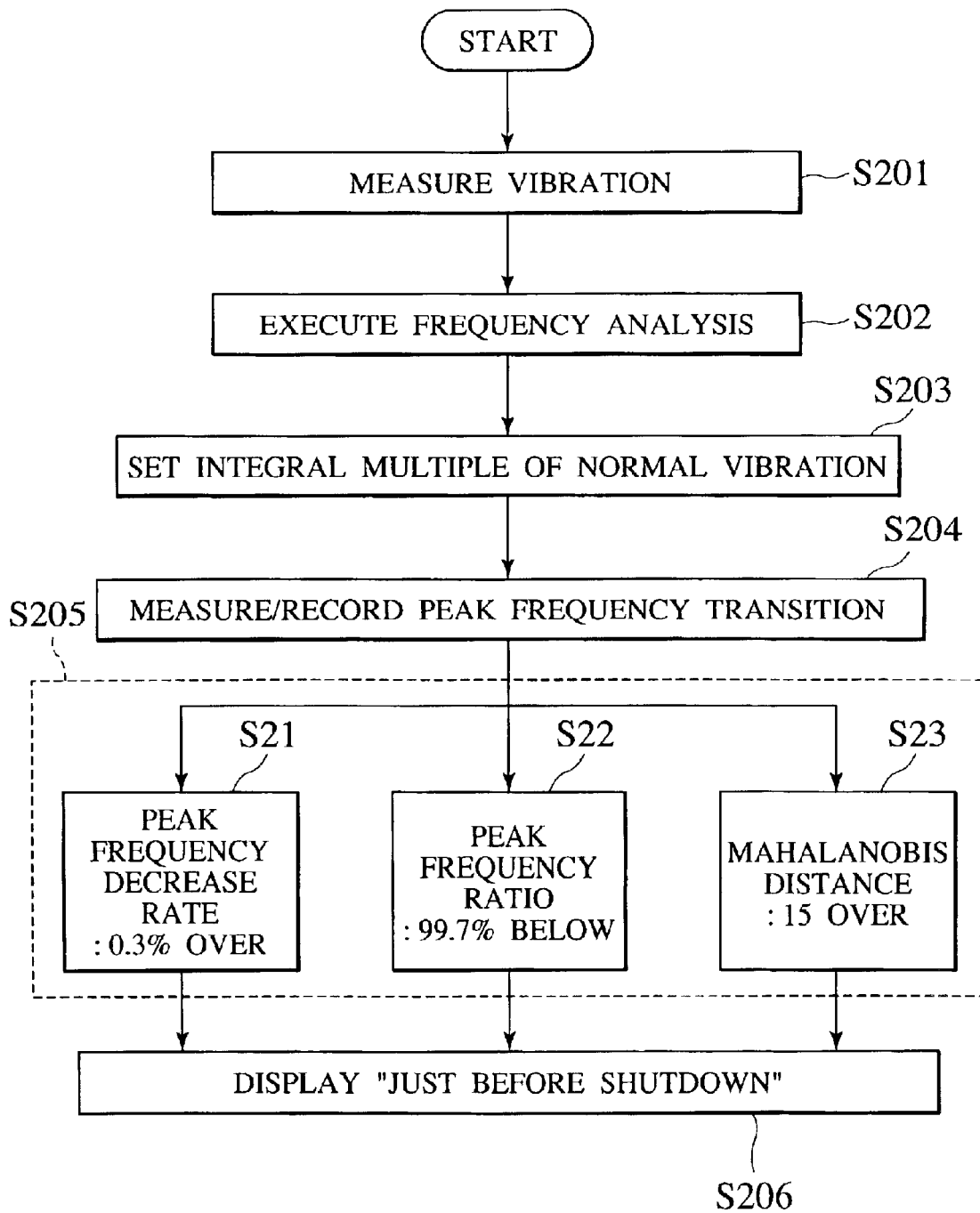
FIG. 12 is a flowchart for showing a life span prediction method for a rotary machine used in the semiconductor manufacturing apparatus according to the second embodiment of the present invention.

Next, using the flowchart shown in FIG. 12, a life span prediction method for a rotary machine used in semiconductor manufacturing apparatus (LPCVD apparatus) according to a second embodiment of the present invention is described. As with the first embodiment, here a rotary machine is a dry pump 3.

(a) In step S201, with the same method as step S101, acceleration (vibration data) is sampled and measured.

(b) Next in step S202, the vibration data obtained in step S201 is converted into frequency domain data using the frequency analysis device (Fourier transformation/analysis device) 37. More specifically, a predetermined number of frequencies are sampled at a predetermined time interval, this is then subjected to a Fourier transformation, and a frequency spectrum is obtained.

(c) While referencing the peaks in the frequency spectrum, in step S203, one of the frequencies that is an integral multiple of the reference vibration is then selected as the analysis target frequency using the frequency decision module 4 of the CPU 39.

(d) Moreover, the acceleration data necessary for life span prediction, or the rotary machine acceleration reference time series data and acceleration evaluation time series data are sampled and measured. The results of the sampling/measurement are then subjected to frequency analysis to obtain time series data composed of diagnosis points showing variation in the analysis target frequency. In other words, the reference time series data is subjected to frequency analysis, variation in the frequency showing the peak acceleration corresponding to the analysis target frequency is used to generate the reference diagnosis data, the evaluation time series data is subjected to the frequency analysis, and the variation in the frequency showing the peak acceleration is used to generate the evaluation diagnosis data. In step S204, time series data showing frequency variation is recorded in a file in the storage unit using the peak frequency transition recording module 7. Here, data showing change over time of the frequency measured during the film deposition step is recorded in a file in the storage unit as input data for the frequency decrease rate determination module 71. In addition, data showing changes in the before/after film deposition step frequency is sampled and measured, and is recorded in a file in the storage unit as input data for the frequency ratio determination module 72. Moreover, data showing frequency changes over time, including the data group in standby mode (constant gas flow conditions) occurring 72 hours prior (between 48 hours prior and 168 hours prior is acceptable) to the day when evaluation of the status of the dry pump 3 is to be made, is recorded in a file in the storage unit as input data for the Mahalanobis distance determination module 73.

(e) Following this, in step S205, the evaluation diagnosis data and reference diagnosis data showing the peak frequency transition (time series data showing frequency variation) recorded in step S204 are read out, and input to the frequency decrease rate determination module 71, frequency ratio determination module 72, and Mahalanobis distance determination module 73. Then using the respective modules, the life span of the respective dry pumps 3 is determined.

1. In step S21, the frequency decrease rate is calculated using the frequency decrease rate determination module 71. Namely, the peak frequency decrease rate monitored during the film deposition step to determine the life span of the dry pump 3. The situation, for instance, when the peak frequency decrease rate during the film deposition step becomes a predetermined value, for example 0.3% or higher, is determined to be just before shutdown or the end of the life span of the dry pump 3.

2. In step S22, the before/after film deposition step frequency ratio in the CVD process is calculated using the frequency ratio determination module 72. Immediately after the film deposition step in the CVD process, the peak frequency that has decreased during the film deposition step returns to the value from before the film deposition step under normal conditions. However, just before shutdown of the dry pump 3, it does not return to the value from before the film deposition step and this phenomenon is utilized to determine the life span of the dry pump 3. The situation where the before/after film deposition step peak frequency ratio (after/before) is at a predetermined value, for example 99.7% or less, is determined to be just before shutdown or the end of the life span of the dry pump 3.

3. In step S23, the Mahalanobis distance determination module 73 is used to determine the life span of the dry pump 3 using the MD. For example, it is determined that the MD is 15 or higher just before shutdown of the dry pump 3. When the MD is used, sensitivity is improved even further.

(f) Then in step S206, based on the determination in step S205, indication showing that the pump is just before shutdown (life span) is displayed.

In this manner, as with the first embodiment, prediction of the life span of the dry pump 3 is possible even if the peak acceleration of the first embodiment is replaced with the peak frequency, and frequency variations occurring in the frequency domain are measured.

(Third Embodiment)

Figure 13:
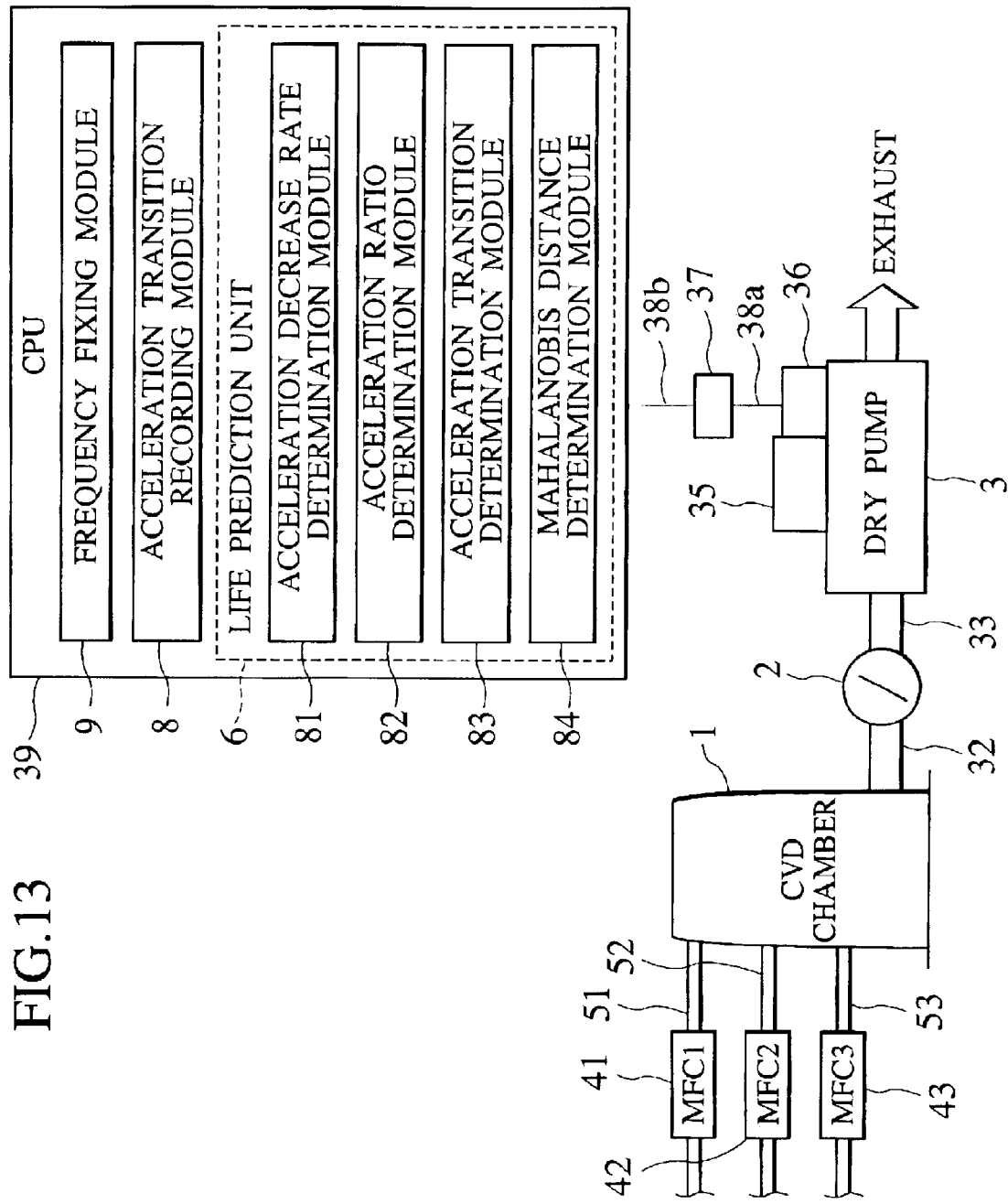
FIG. 13 is a schematic diagram of semiconductor manufacturing apparatus according to a third embodiment of the present invention.

FIG. 13 is a schematic diagram of an LPCVD apparatus, which is used as a semiconductor manufacturing apparatus, according to a third embodiment of the present invention. According to the first embodiment, the frequency having peak acceleration variation in the frequency domain near the analysis target frequency is determined by the frequency decision module 4, and there is no reason for it to be fixed at the same frequency. In the third embodiment of the present invention, in the case where the frequency to be analyzed is fixed at 300 Hz, life span prediction for the dry pump 3 used in the LPCVD apparatus is performed with acceleration time series data monitored at 300 Hz. FIG. 13 is nearly the same as FIG. 1 except for the modules installed in the CPU 39 being different. Namely, acceleration transition recording module 8, frequency fixing module 9, and life span prediction unit 6 are installed in the CPU 39. The frequency spectrum transmitted to the CPU 39 is analyzed to determine the analysis target frequency with the frequency decision module 4 in FIGS. 1 and 11, however, in the case of FIG. 13, the frequency to be analyzed is fixed at a certain value, for example, at 300 Hz from the start. For instance, if 300 Hz is input to an input device of a computer system installed with the CPU 39, the frequency fixing module 9 fixes the analysis target frequency at 300 Hz. The 300 Hz acceleration time series data that has been sampled and measured is recorded in a file in a storage unit with the acceleration transition recording module 8. Namely, with the results of frequency analysis by a frequency analysis device such as the Fourier transform/analysis device 37, the acceleration transition recording module 8 generates reference diagnosis data from the reference time series data using variations in the peak value of acceleration fixed at the analysis target frequency, generates evaluation diagnosis data from the evaluation time series data using variations in the peak value of acceleration fixed at the analysis target frequency, and records this reference diagnosis data and evaluation diagnosis data. Life span determination is performed for the dry pump 3 with the life span prediction unit 6 based on the data obtained by the acceleration transition recording module 8. In addition, the life span prediction unit 6 has four modules installed: acceleration decrease rate determination module 81, acceleration ratio determination module 82, acceleration transition determination module 83, and Mahalanobis distance determination module 84. These four modules carry out substantially same determination as the acceleration decrease rate determination module 61, acceleration ratio determination module 62, acceleration transition determination module 63, and Mahalanobis distance determination module 64 described in FIG. 1 regarding the analysis target frequency fixed at 300 Hz. Since the rest is similar to FIG. 1, repetitive description is omitted. However, in the case where the frequency to be analyzed is fixed at a certain value from the start, a band pass filter or a narrow band amplifier may be used instead of the frequency analysis device 37. In this case analog acceleration data fixed at 300 Hz is sent to the CPU 39 from the band pass filter or the narrow band amplifier, and this analog data may be then subjected to A/D conversion either within the CPU 39 or with an interface.

Next, using the flowchart shown in FIG. 14, a life span prediction method for a rotary machine used in a semiconductor manufacturing apparatus (LPCVD apparatus) according to the third embodiment of the present invention is described as an example in the case where the frequency to be analyzed is fixed at 300 Hz. Here, as with the first and second embodiments, the rotary machine is a dry pump 3.

(a) In step S301, with the same method as step S101, acceleration (vibration data) is sampled and measured.

(b) Next in step S302, the vibration data obtained in step S301 is decomposed into frequency components in order to obtain an acceleration frequency spectrum using the frequency analysis device (Fourier transformation/analysis device) 37.

(c) In step S303, the 300 Hz fixed acceleration is extracted from the acceleration frequency spectrum obtained in step S301. In addition, the analysis target frequency is fixed at 300 Hz.

(d) Namely, the first reference time series data of the acceleration of the rotary machine and then the evaluation time series data of this acceleration are respectively sampled and measured, and the acceleration component at 300 Hz is extracted. More specifically, the reference time series data is subjected to frequency analysis, the acceleration fixed at the analysis target frequency is used to generate the reference diagnosis data, the evaluation time series data is subjected to frequency analysis, and the acceleration fixed at the analysis target frequency is used to generate the evaluation diagnosis data. For instance, acceleration time series data is sampled and measured during the film deposition step, and the fixed analysis target frequency (300 Hz) component is extracted as input data for the acceleration decrease rate determination module 81. In addition, before/after film deposition step acceleration time series data is sampled and measured, and the 300 Hz component is extracted as input data for the acceleration ratio determination module 82. Moreover, acceleration time series data occurring under conditions other than the LPCVD process is sampled and measured, and the 300 Hz component is extracted as input data for the acceleration transition determination module 83. Moreover, acceleration time series data, including the data group in standby mode (constant gas flow conditions) occurring 72 hours prior (between 48 hours prior and 168 hours prior is acceptable) to the day when evaluation of the status of the dry pump 3 is to be made, is sampled and measured, and the 300 Hz component is extracted as input data for the Mahalanobis distance determination module 84. In step S304, using the acceleration transition recording module 8, time series data (the reference diagnosis data and evaluation diagnosis data) composed with the acceleration diagnosis point group when these are at 300 Hz, is recorded in a file in the storage unit.

(e) Following this, in step S305, time series data (reference diagnosis data and evaluation diagnosis data), including with the acceleration diagnosis point group obtained in step S304 is read out from the storage unit, and input to the acceleration decrease rate determination module 81, acceleration ratio determination module 82, acceleration transition determination module 83, and Mahalanobis distance determination module 84. Then using the respective modules, the life span of the dry pump 3 is determined:

1. In step S31, using the acceleration decrease rate determination module 81, the 300 Hz fixed acceleration decrease rate during the film deposition step is calculated. Namely, the phenomenon where the 300 Hz fixed acceleration decreases during the film deposition step is used to determine the life span of the dry pump 3. The situation where the 300 Hz fixed acceleration decrease rate becomes 85% or greater during the film deposition step is determined to be just before shutdown or the end of the life span of the dry pump 3.

2. In step S32, using the acceleration ratio determination module 82, the before/after film deposition 300 Hz fixed acceleration ratio (after/before) is calculated. Immediately after a film deposition step during the CVD process, the 300 Hz fixed acceleration that has decreased during the film deposition step returns to a value from before the film deposition step under normal conditions. However, just before shutdown of the dry pump 3, it does not return to the pre-film deposition step value and this phenomenon is utilized to determine the life span of the dry pump 3. The situation where the pre-/post-film deposition step 300 Hz fixed acceleration ratio (after/before) becomes 90% or less is determined to be just before shutdown or the end of the life span of the dry pump 3.

3. In step S33, using the acceleration transition determination module (module) 83, life span is determined with the 300 Hz fixed acceleration change over time sampled and measured outside of the CVD process. More specifically, using the 300 Hz fixed acceleration sampled and measured outside of the CVD process, since it has been verified that it changes due to accumulation of deposited material within the dry pump 3, the fact that the 300 Hz fixed acceleration that had been constant since immediately after pump replacement increases on a predetermined day before pump shutdown and then decreases just before the shutdown of the dry pump 3 is used as the determination reference. More specifically, it is determined that the life span of the dry pump 3 is approaching when the 300 Hz fixed acceleration decreases after increasing in cases where the gas flow into the dry pump 3 is fixed, for example in standby mode. In particular, since the acceleration measurement may be completed in a short period of time, the life span of the dry pump 3 may be efficiently predicted.

4. In step S34, using the Mahalanobis distance determination module (module) 84, the Mahalanobis space generated from the (300 Hz fixed) acceleration data group during normal mode is used as a reference to calculate the Mahalanobis distance MD. The life span of the dry pump 3 is then determined from changes in the Mahalanobis distance. For example, determination of being just before shutdown should be made when the Mahalanobis distance MD is 15 or higher. When the Mahalanobis distance MD is used, sensitivity is improved even further.

(f) Then in step S306, based on the determination in step S305, indication signalling that the dry pump 3 is in a state just before shutdown is displayed.

According to the life span prediction method of a rotary machine used in semiconductor manufacturing apparatus (LPCVD apparatus) of the third embodiment of the present invention, even if the frequency to be analyzed is fixed at 300 Hz, it is possible to predict the life span of the dry pump 3 in the same manner as the first embodiment.

(Other Embodiments)

The present invention has been described through the first through third embodiments as mentioned above, however the descriptions and drawings that constitute a portion of this disclosure should not be perceived as limiting this invention. Various alternative embodiments and operational techniques will become clear to persons skilled in the art from this disclosure.

In the descriptions of the first through third embodiments described earlier, it has been described that the reference time series data and evaluation time series data for the rotary machine acceleration are respectively sampled and measured, and then reference diagnosis data and evaluation diagnosis data are generated from the reference time series data and evaluation time series data, respectively.

Nevertheless, under constant conditions, the fact that the steps of sampling and measuring the reference time series data for the rotary machine acceleration, as well as the generation of reference diagnosis data from the reference time series data may be omitted may be easily realized upon comprehension of the main points of the present invention.

In addition, in the descriptions of the first through third embodiments, a Roots-type dry pump 3 is illustrated as an example of a rotary machine, and examples where variation in peak acceleration and variation in the peak frequency of the dry pump 3 have been described, however, it has been verified that similar results may be obtained with screw-type dry pump. Moreover, a rotary machine such as an oil-sealed rotary pump is also allowable.

Moreover, as long as the analysis target frequency is an integral multiple of the number of rotations of the rotary machine, is it not dependent on the number of rotor blades. Furthermore, by simultaneously analyzing a plurality of frequencies abnormalities in different portions may be confirmed. The data sampling conditions in this case are required to correspond to the maximum frequency.

Furthermore, in the above description, the case where a silicon nitride film is deposited through a reaction of dichlorosilane gas and ammonia gas is illustrated as an example, however, naturally, source gases are not limited to dichlorosilane gas and ammonia gas. Moreover, the example of LPCVD for $Si_3N_4$ film should not be construed as limiting; LPCVD for thin films with other materials is similarly applicable. In addition, an example where a single type of thin film is grown is shown, however, similar effects may be obtained in the case of forming a thin film having a plurality of species, such as a $Si_3N_4$ film, TEOS oxide film, and polycrystalline silicon with the same LPCVD apparatus.

It should be noted that an example of an LPCVD process is illustrated in the first through third embodiments. In the present invention similar results have been confirmed in the case where reaction product is deposited inside the dry pump resulting in the pump shutting down and may be applicable to CVD processes in general and also such as the dry etching process.

In this manner, the present invention naturally includes various embodiments not specifically mentioned herein. Accordingly, the technical scope of the first embodiment of the present invention may be limited only by the inventive features set forth by the scope of the patent claims deemed reasonable from the above description. Various modifications will become possible for those skilled in the art after receiving the teachings of the present disclosure without departing from the scope thereof.

What is claimed is:

1. A method for predicting a life span of a rotary machine used in a manufacturing apparatus, comprising:

measuring reference time series data of an acceleration of the rotary machine and evaluation time series data of the acceleration respectively, with a sampling interval of less than a half the reciprocal of an analysis target frequency, wherein the sampling interval is a time between samples within a single sampling sequence, a number of samples being at least four times a numerical value of the analysis target frequency, the rotary machine being a dry used in the manufacturing apparatus;

generating reference diagnosis data based on variations in a characteristic corresponding to the analysis target frequency by subjecting the reference time series data to a frequency analysis, the characteristic representing a peak acceleration value;

generating evaluation diagnosis data based on variations in a peak value by subjecting the evaluation time series data to the frequency analysis; and forming a Mahalanobis space with the reference diagnosis data obtained from the reference time series data measured at a time that is earlier than the time where the evaluation time series data is measured by a predetermined length of time determined through an empirical rule under the same process conditions as the evaluation time series data, calculating a Mahalanobis distance of the evaluation diagnosis data based on the Mahalanobis space, and determining a time point where the Mahalanobis distance exceeds a threshold value as just before the end of the life span.

2. A method for predicting a life span of a rotary machine used in a manufacturing apparatus, comprisinq:

measuring reference time series data of an acceleration of the rotary machine and evaluation time series data of the acceleration respectively, with a sampling interval of less than a half the reciprocal of an analysis target frequency, wherein the sampling interval is a time between samples within a single sampling sequence, a number of samples being at least four times a numerical value of the analysis target frequency, the rotary machine being a dry pump used in the manufacturing apparatus;

generating reference diagnosis data based on variations in a characteristic corresponding to the analysis target frequency by subjecting the reference time series data to a frequency analysis, the characteristic representing a peak acceleration value;

generating evaluation diagnosis data based on variations in a peak value by subjecting the evaluation time series data to the frequency analysis; and forming a Mahalanobis space with the reference diagnosis data obtained from the reference time series data measured at a time that is earlier than the time where the evaluation time series data is measured by a length of time determined through an empirical rule under the same process conditions as the evaluation time series data, calculating a Mahalanobis distance of the evaluation diagnosis data based on that Mahalanobis space, and determining a time point where that Mahalanobis distance exceeds a threshold value as just before the end of the life span.

3. A life predicting system, comprising:

a rotary machine;

an accelerometer for sampling and measuring reference time series data for an acceleration of the rotary machine and evaluation time series data of the acceleration respectively, with a sampling interval being less than half a reciprocal of an analysis target frequency, wherein the sampling interval is a time between samples within a single sampling sequence, a number of samples being at least four times a numerical value of the analysis target frequency, a frequency analysis device for performing a frequency analysis on an output from the accelerometer;

a peak acceleration transition recording module for generating reference diagnosis data based on variations in a characteristic corresponding to the analysis target frequency from the reference time series data, generating evaluation diagnosis data based on variations in a peak value from the evaluation time series data, with results of the frequency analysis, and recording the reference diagnosis data and the evaluation diagnosis data; and a life span determination unit for determining life span of the rotary machine using the reference diagnosis data and the evaluation diagnosis data, so as to form a Mahalanobis space with the reference diagnosis data obtained from the reference time series data measured at a time that is earlier than the time when the evaluation time series data is measured by a length of time determined through an empirical rule under the same process conditions as the evaluation time series data, calculate a Mahalanobis distance of the evaluation diagnosis data based on said Mahalanobis space, and determine a time point when said Mahalanobis distance exceeds a threshold value just before the end of the life span.

4. The system of claim 3, wherein the rotary machine is a dry pump used in semiconductor manufacturing apparatus.

5. The system of claim 4, wherein the analysis target frequency is fixed at an integral multiple of a reference frequency unique to the dry pump.

6. The system of claim 4, wherein the characteristic represents a peak acceleration value.

7. The system of claim 4, wherein the characteristic represents a frequency at the peak acceleration.

8. The system of claim 4, wherein the accelerometer is placed on a top surface of a gear box of the dry pump, on a side surface of the gear box, on a bottom surface of the gear box, on a top surface of a casing within 20 cm from the gear box, on a side surface of the casing, on a bottom surface of the casing.

* * * * *

UNITED STATES PATENT AND TRADEMARK OFFICE
CERTIFICATE OF CORRECTION

PATENT NO. : 6,885,972 B2
DATED : April 26, 2005
INVENTOR(S) : Samata et al.

It is certified that error appears in the above-identified patent and that said Letters Patent is hereby corrected as shown below:

Column 17,
Line 61, change "dry used" to -- dry pump used --.

Column 18,
Line 15, change "comprisinq" to -- comprising --.
Line 56, change "frequency," to -- frequency; --.

Column 20,
Line 13, change "casing," to -- casing, or --.

Signed and Sealed this

Twenty-third Day of August, 2005

JON W. DUDAS
*Director of the United States Patent and Trademark Office*